(12) United States Patent
Sugizaki et al.

(10) Patent No.: US 9,185,259 B2
(45) Date of Patent: Nov. 10, 2015

(54) IMAGE READING APPARATUS

(71) Applicant: FUJI XEROX CO., LTD., Tokyo (JP)

(72) Inventors: Tadashi Sugizaki, Yokohama (JP); Mari Uematsu, Yokohama (JP); Yasuhiro Kitaichi, Yokohama (JP); Hiroshi Watanabe, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/528,307

(22) Filed: Oct. 30, 2014

(65) Prior Publication Data
US 2015/0237230 A1 Aug. 20, 2015

(30) Foreign Application Priority Data

Feb. 19, 2014 (JP) .................................. 2014-029980
Mar. 3, 2014 (JP) .................................. 2014-041006

(51) Int. Cl.
*H04N 1/04* (2006.01)
*H04N 1/10* (2006.01)

(52) U.S. Cl.
CPC ...... *H04N 1/1065* (2013.01); *H04N 2201/0081* (2013.01)

(58) Field of Classification Search
CPC .................... H04N 1/1065; H04N 2201/0081
USPC .................................. 358/497, 498, 474, 496
See application file for complete search history.

(56) References Cited

U.S. PATENT DOCUMENTS 7,522,318 B2 * 4/2009 Lee .................... G03B 27/52
                                                                                              250/234
2005/0052710 A1 3/2005 Okuda

FOREIGN PATENT DOCUMENTS

| JP | A-2005-86482 | 3/2005 |
| JP | A-2007-13309 | 1/2007 |
| JP | A-2010-22021 | 1/2010 |

* cited by examiner

*Primary Examiner* — Houshang Safaipour
(74) *Attorney, Agent, or Firm* — Oliff PLC

(57) ABSTRACT

An image reading apparatus includes a reading apparatus body, an accommodation member, and a positioning member. The reading apparatus body reads a document mounted on a document platen. The accommodation member accommodates the reading apparatus body and moves from one end portion to the other end portion of the document when reading the document. The positioning member is mounted on the reading apparatus body, the positioning member having a convex section positioning the reading apparatus body in a height direction by coming into contact with the document platen and an engaging section engaging with an engaged section formed in the accommodation member in the height direction.

7 Claims, 19 Drawing Sheets

IMAGE READING APPARATUS

CROSS-REFERENCE TO RELATED APPLICATIONS

This application is based on and claims priority under 35 USC 119 from Japanese Patent Application No. 2014-029980 filed on Feb. 19, 2014, and Japanese Patent Application No. 2014-041006 filed on Mar. 3, 2014.

BACKGROUND

Technical Field

The present invention relates to an image reading apparatus.

SUMMARY

An aspect of the invention provides an image reading apparatus including: a reading apparatus body that reads a document mounted on a document platen; an accommodation member that accommodates the reading apparatus body and moves from one end portion to the other end portion of the document when reading the document; and a positioning member that is mounted on the reading apparatus body, the positioning member having a convex section positioning the reading apparatus body in a height direction by coming into contact with the document platen and an engaging section engaging with an engaged section formed in the accommodation member in the height direction.

BRIEF DESCRIPTION OF THE DRAWINGS

Exemplary embodiment(s) of the present invention will be described in detail based on the following figures, wherein.

DETAILED DESCRIPTION

Hereinafter, a first exemplary embodiment of the invention will be described in detail with reference to the drawings. Moreover, in each view, arrow UP is referred to as an upper direction of an image reading apparatus 10 and arrow FR is referred to as a front direction of the image reading apparatus 10. Then, arrow RI is referred to as a right direction in an image reading apparatus 10 and is referred to as a main scanning direction (moving direction of an accommodation member 30) when a reading apparatus body 50 reads a document mounted on a document platen 14. Furthermore, in the document mounted on the document platen 14, a left-right direction is a longitudinal direction.

Figure 1:
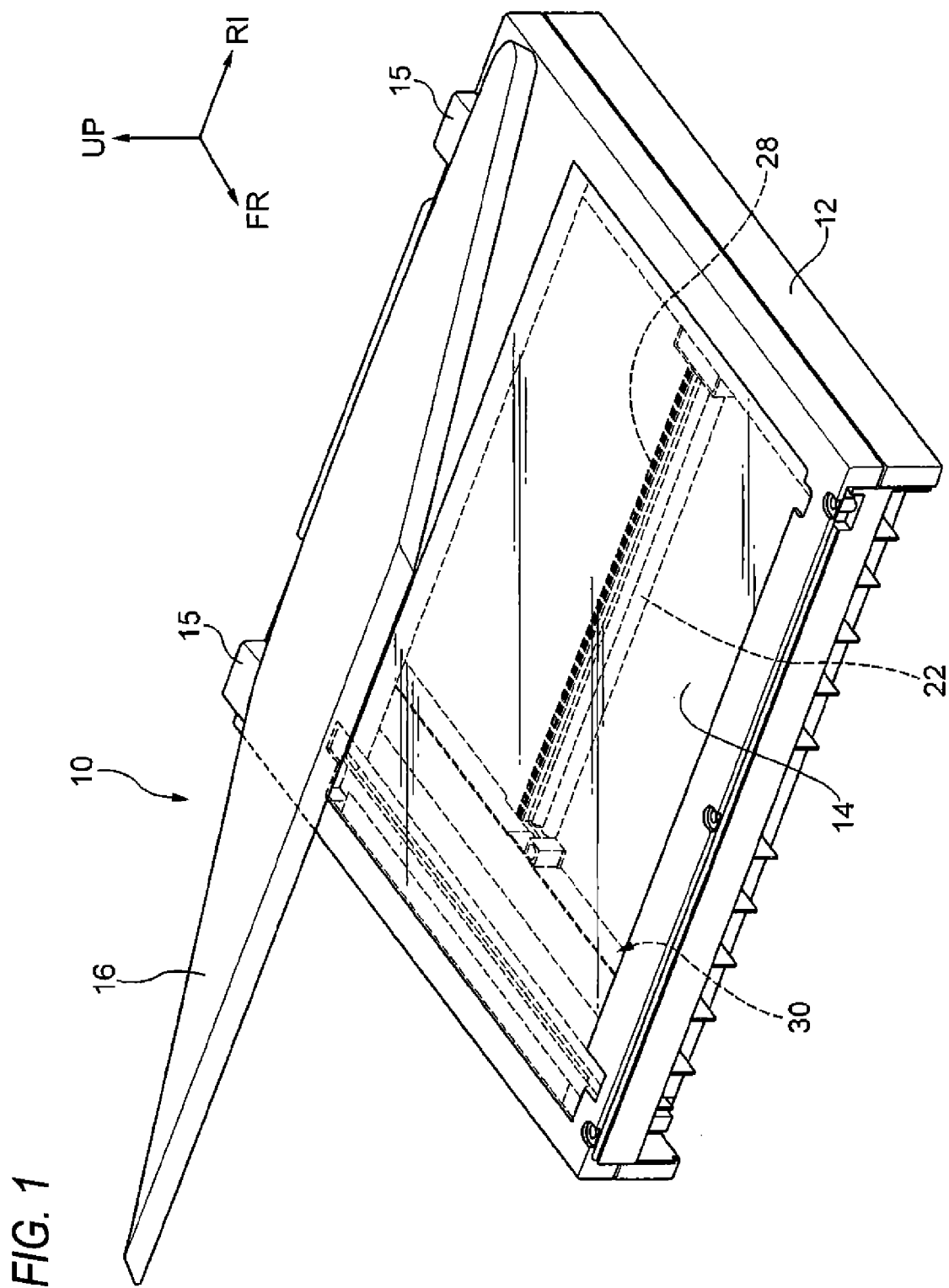
FIG. 1 is a perspective view illustrating an image reading apparatus.

As illustrated in FIG. 1, the image reading apparatus 10 has the document platen 14 on a side of an upper portion of a case 12, on which a document is mounted. The document platen 14 is a transparent glass plate formed in a rectangular shape in which a left-right direction is a longitudinal direction and is open and closed by a cover 16. The cover 16 is formed in a rectangular shape slightly larger than the document platen 14 and is openably and closably configured in an up-down direction by a pair of left and right hinge sections 15 on a rear portion side of the case 12.

Figure 2:
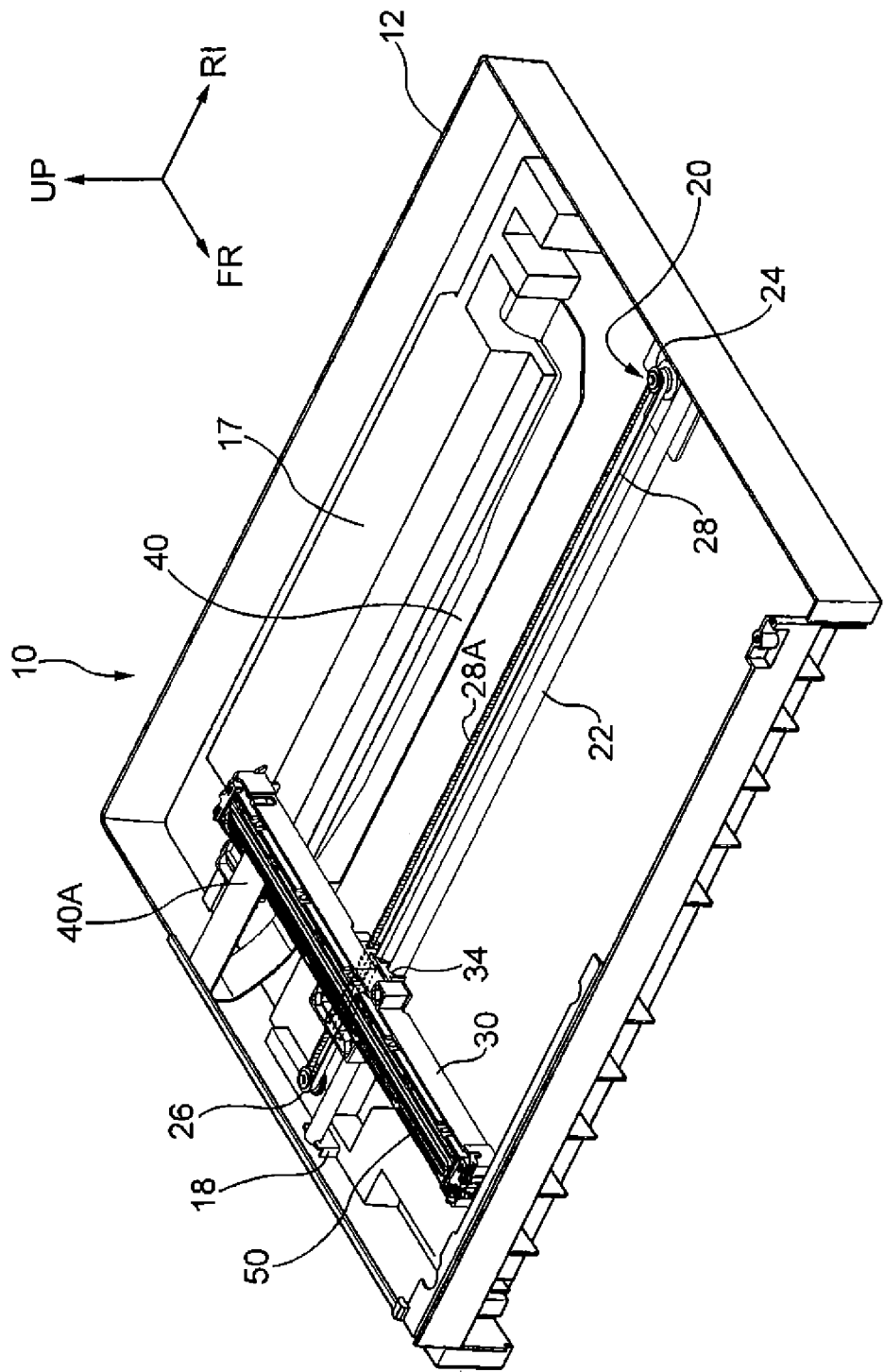
FIG. 2 is a perspective view illustrating an inside of the image reading apparatus.

As illustrated in FIG. 2, the reading apparatus body (CIS unit) 50 reading a document mounted on the document platen 14 is provided on the inside (lower side of the document platen 14) of the case 12. The reading apparatus body 50 has a length that is equal to a length of a document or more in a lateral direction (direction orthogonal to the longitudinal direction of the document) of the document and reads a document while moving in a main scanning direction (from one end portion to the other end portion of the document in the longitudinal direction). Then, a moving mechanism 20 moving the reading apparatus body 50 (accommodation member 30 described below) in the main scanning direction is provided on the inside (lower side of the document platen 14) of the case 12.

When describing in detail, the moving mechanism 20 has a cylindrical shaft 22 provided in a substantially center portion inside the case 12 in a front-rear direction in which the left-right direction (main scanning direction) is an axial direction. Both left and right end portions of the shaft 22 are fixed to a support section 18 integrally formed with both left and right end portions inside the case 12 and the shaft 22 movably supports the accommodation member (carriage housing) 30 in which the reading apparatus body 50 is accommodated in the main scanning direction (right direction) and in a returning direction (left direction) opposite to the main scanning direction.

Furthermore, the moving mechanism 20 has a timing belt 28 and a driving motor (not illustrated). The timing belt 28 is wound around a timing pulley 24 provided on a side of a right end portion (one end portion of the shaft 22 in the axial direction) inside the case 12 and a timing pulley 26 provided on a side of a left end portion (the other end portion of the shaft 22 in the axial direction) inside the case 12 so as to mesh meshing teeth 28A formed on an inner peripheral surface therewith. The driving motor is coaxially provided with the timing pulley 24 of one side (for example, the right side) and rotates the timing pulley 24 in both forward and reverse directions.

Thus, the timing pulley 24 is rotated in both forward and reverse directions by the driving of the driving motor and thereby one side of front and rear sides of the timing belt 28 moves in the main scanning direction and the other side of the front and rear sides moves in the returning direction. That is, one side of front and rear sides and the other side of the front and rear sides of the timing belt 28 move in opposite directions in synchronization with each other. Then, as illustrated in FIG. 3, for example, the accommodation member 30 is mounted on the timing belt 28 of the front side.

When describing in detail, the accommodation member 30 is a case (having a length equal to or greater than a length of a document in the lateral direction) in which the front-rear direction (direction orthogonal to the main scanning direction in a plan view) is the longitudinal direction. The accommodation member 30 is molded from a resin material (for example, flame retarding modified polyphenylene ether (PPE) including glass molding material) including glass to secure dimensional accuracy and prevent deformation due to temperature. Then, as illustrated in FIGS. 2 to 5, a guide member 34 that is supported on the shaft 22 is mounted on a substantially center portion in the longitudinal direction on a lower surface side of a bottom wall 32 of the accommodation member 30.

Figure 3:
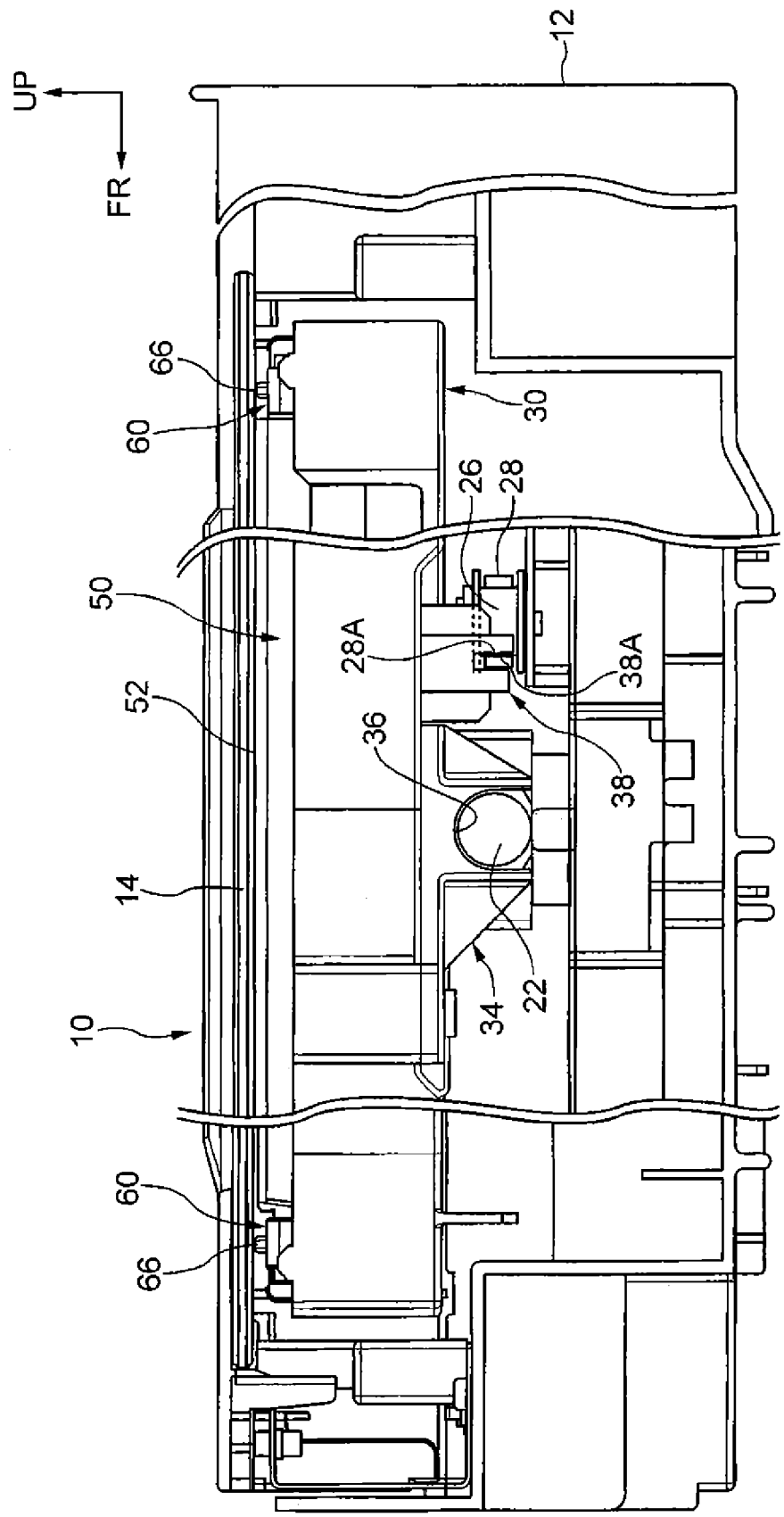
FIG. 3 is an enlarged side view illustrating the image reading apparatus when being partially omitted.
Figure 5:
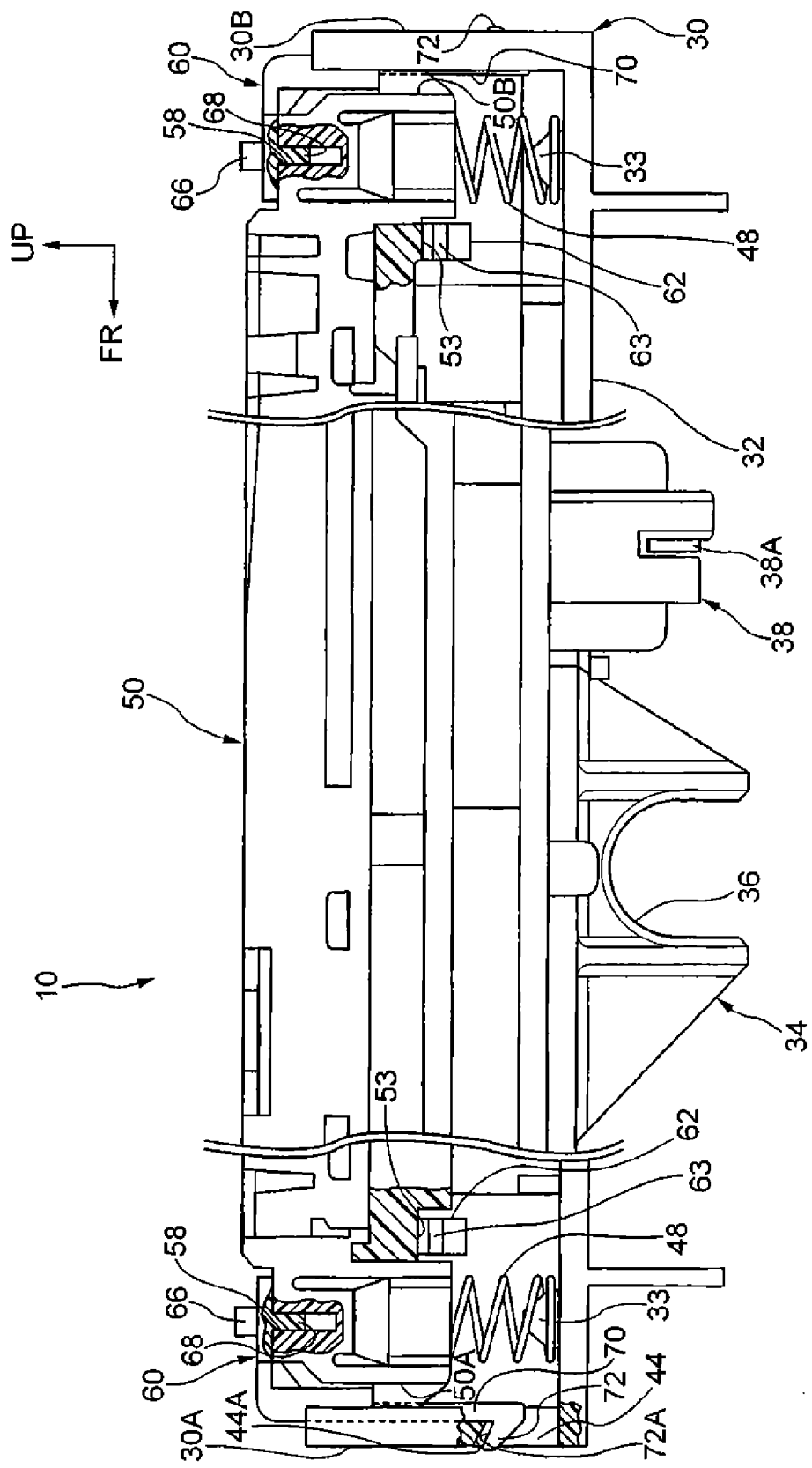
FIG. 5 is an enlarged side view illustrating the reading apparatus body accommodated in the accommodation member when being partially omitted.

As illustrated in FIGS. 3 and 5, the guide member 34 has groove sections 36 having substantially U shapes respectively when viewed in the main scanning direction in an end portion on a downstream side and an end portion on an upstream side in the main scanning direction. Each groove section 36 is mounted on the outer peripheral surface of the shaft 22 from above and thereby a substantially center portion of the accommodation member 30 in the longitudinal direction is supported on the shaft 22. Moreover, as illustrated in FIG. 2, both end portions of the accommodation member 30 in the longitudinal direction are movably supported on a support platen 17 integrally formed with the case 12.

Furthermore, as illustrated in FIGS. 3 and 5, a meshing section 38 meshing with the meshing teeth 28A of the timing belt 28 is integrally formed in a substantially center portion (rear side of the guide member 34) in the longitudinal direction on the lower surface side of the bottom wall 32 in the vicinity of the guide member 34. The meshing section 38 is formed in a rectangular block shape and a gap equal to or greater than a thickness of the timing belt 28 is formed in the center portion of the lower end thereof. Then, meshing teeth 38A are formed on an inner surface of the meshing section 38 on one side (rear side in the first exemplary embodiment) in the gap.

Thus, as illustrated in FIG. 3, a front side of the timing belt 28 is inserted into the gap of the meshing section 38. The meshing teeth 28A on the front side thereof mesh with the meshing teeth 38A and thereby the accommodation member 30 is fixed to the timing belt 28 through the meshing section 38 in a circumferential direction thereof. Thus, the accommodation member 30 moves in the main scanning direction and the returning direction while being supported by the shaft 22 and the support platen 17 according to the movement of the timing belt 28.

Moreover, as illustrated in FIG. 2, a flexible cable 40 for transmitting image data read by the reading apparatus body 50 is disposed in the case 12 on the rear side farther than the timing belt 28. One end portion 40A of the flexible cable 40 is connected to the reading apparatus body 50. Then, the flexible cable 40 is capable of following the movement of the accommodation member 30 into which the reading apparatus body 50 is accommodated.

Figure 4:
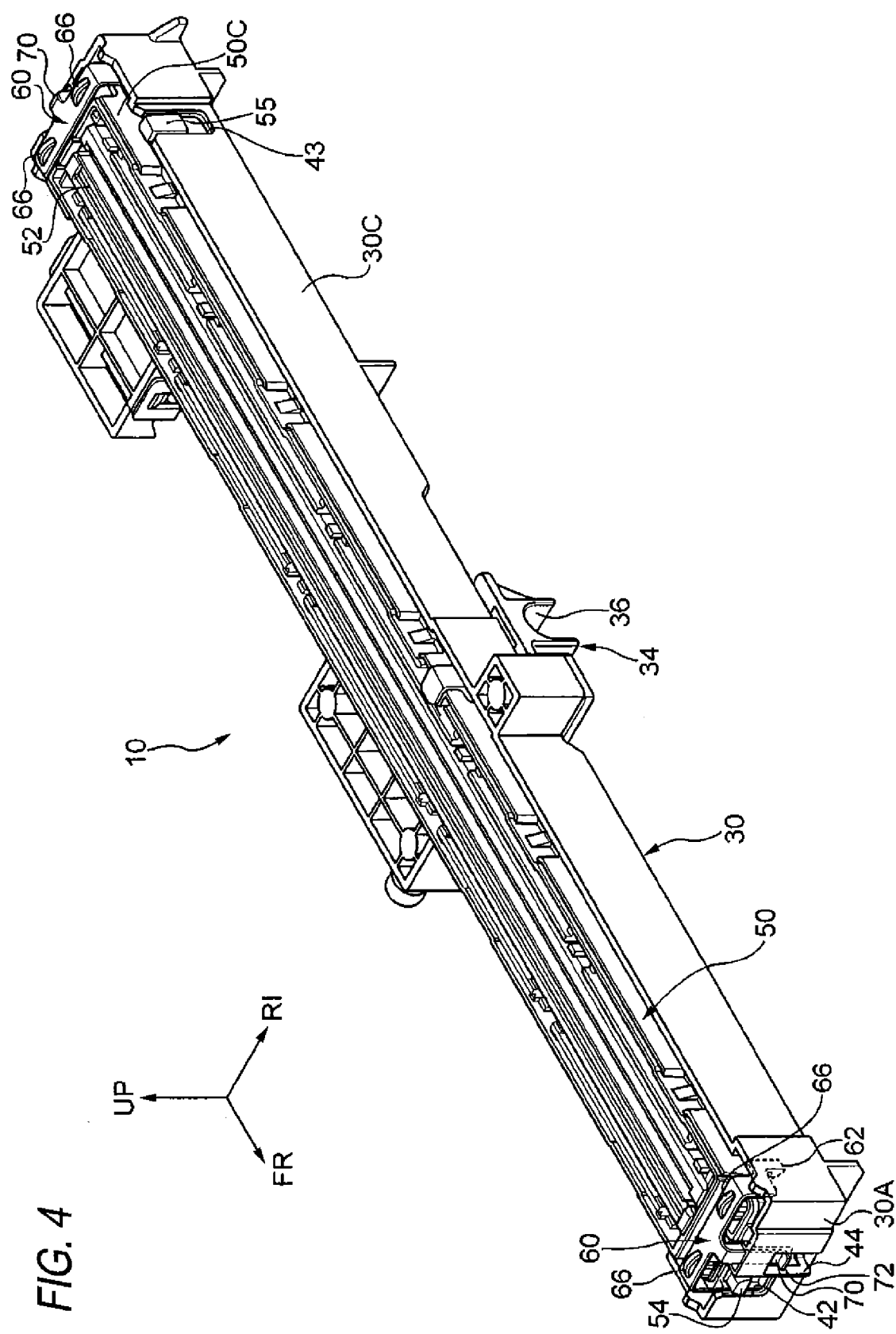
FIG. 4 is a perspective view illustrating a reading apparatus body accommodated in an accommodation member.

As illustrated in FIG. 4, the reading apparatus body 50 is formed in an elongated shape (having a length equal to or greater than a length of a document in the lateral direction) in which the front-rear direction (direction orthogonal to the main scanning direction in a plan view) is the longitudinal direction. The reading apparatus body 50 is molded from a resin material (for example, a molding material of flame retarding modified polyphenylene ether (PPE) including glass molding material) including glass to secure dimensional accuracy and prevent deformation due to temperature. Then, a reading section 52 is provided in the upper portion of the reading apparatus body 50 and in the center portion in a width direction (left-right direction and main scanning direction) along the longitudinal direction of the reading apparatus body 50 (extending in the longitudinal direction).

Figure 6:
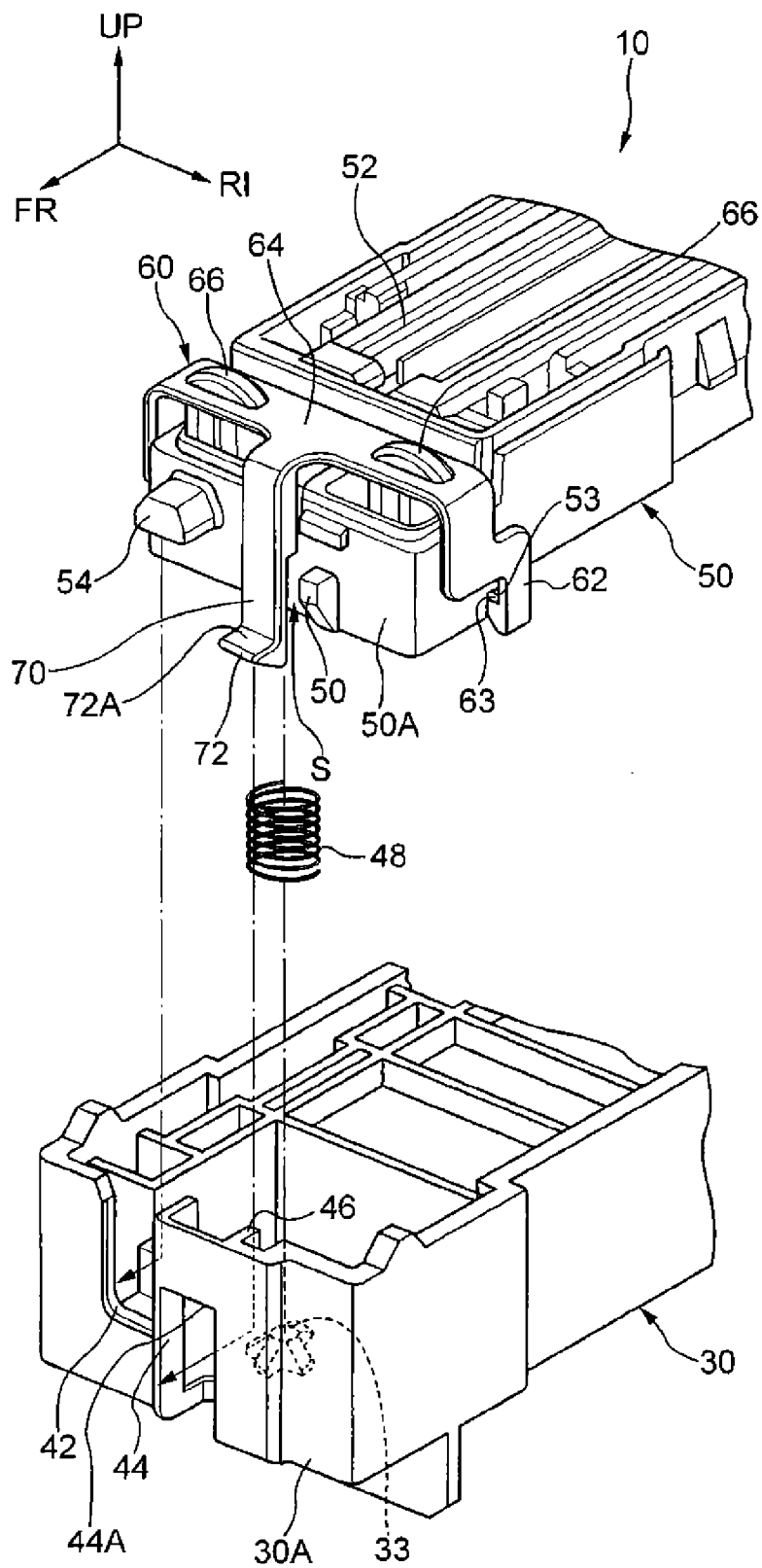
FIG. 6 is a partially enlarged perspective view illustrating a process of assembling the reading apparatus body in the accommodation member.

In addition, as illustrated in FIG. 6, the reading apparatus body 50 is inserted into and accommodated in the accommodation member 30 from above. Moreover, an inserting section 54 and a protrusion section 56 described below which are respectively provided in a front wall 50A and a rear wall 50B (see FIG. 5) of the reading apparatus body 50 are formed front/rear symmetrically. Similarly, the cutout section 42 and a rib 46 (see FIG. 9) described below which are respectively provided in the front wall 30A and the rear wall 30B (see FIG. 5) of the accommodation member 30 are formed symmetrically in the front and rear sides.

When describing in detail, as illustrated in FIG. 6, convex (prismatic) inserting sections 54 respectively protruding in the longitudinal direction of the reading apparatus body 50 are formed integrally and in the same position in the main scanning direction in the front wall 50A and the rear wall 50B (see FIG. 5) of the reading apparatus body 50. Moreover, as illustrated in FIG. 4, a convex (prismatic) inserting section 55 protruding in the main scanning direction (right direction) is integrally formed on a side (for example, rear side) of one end portion in the longitudinal direction in a right wall 50C of the reading apparatus body 50.

Meanwhile, cutout sections 42 as an example of the inserted section which is open upward are formed in the same position in a front wall 30A and a rear wall 30B (see FIG. 5) of the accommodation member 30 in the main scanning direction. Then, as illustrated in FIG. 4, a cutout section 43 as an example of the inserted section which is open upward is formed on a side (for example, the rear side) of one end portion in the longitudinal direction in a right wall 30C of the accommodation member 30.

Here, a width of each of the cutout sections 42 and 43 is equal to or slightly greater than a width of each of the inserting sections 54 and 55. Thus, when the reading apparatus body 50 is accommodated in the accommodation member 30, each of the inserting sections 54 and 55 is configured to be inserted into each of the cutout sections 42 and 43 substantially without a gap (see FIG. 7).

Figure 7:
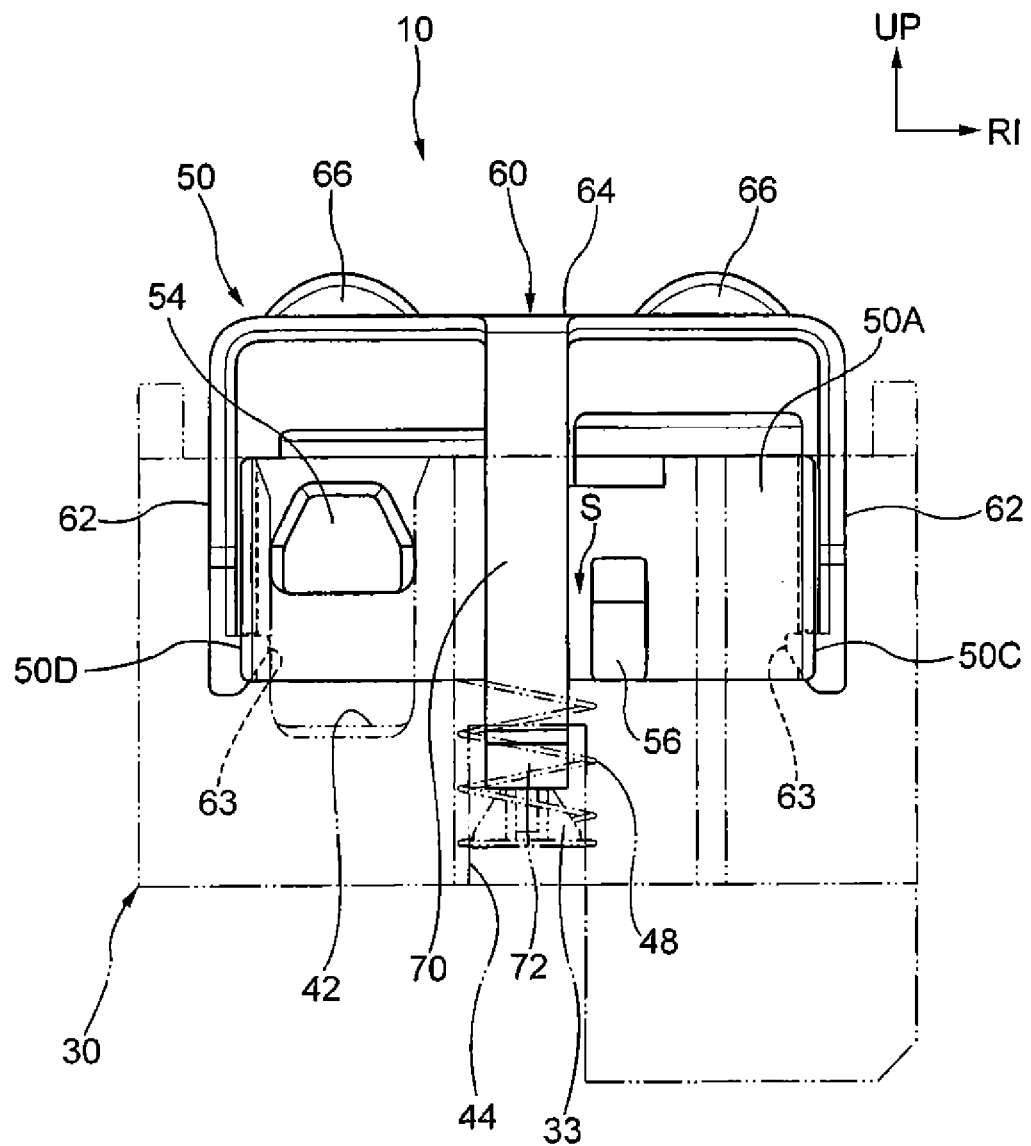
FIG. 7 is a front view illustrating the reading apparatus body accommodated in the accommodation member.
Figure 9:
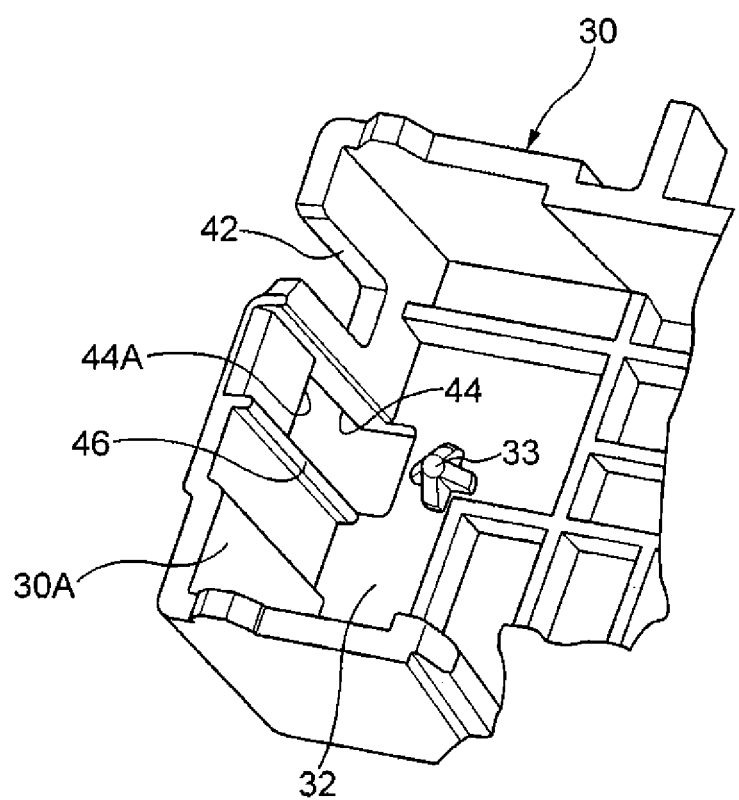
FIG. 9 is an enlarged perspective view illustrating a part of the accommodation member.

Furthermore, as illustrated in FIGS. 6, 7, and 9, opening sections 44 as an example of an engaged section with which an engaging section 70 described below is capable of engaging in a height direction (up-down direction) are formed in a substantially center portion of the front wall 30A and the rear wall 30B (see FIG. 5) of the accommodation member 30 in the left-right direction. The opening section 44 is formed in a rectangular shape in which the height direction is the longitudinal direction and both end portions of the bottom wall 32 in the longitudinal direction and a part of a substantially center portion thereof in the left-right direction are formed to be cutout.

Then, as illustrated in FIG. 9, boss sections 33 into which a lower end portion of coil springs 48 described below are fitted integrally protrude and in a substantially center portion in the left-right direction on the upper surface (bottom surface) of the bottom wall 32 on the inside of the accommodation member 30 further than the opening section 44 in the longitudinal direction. The boss section 33 is formed in a cross shape in a plan view and is inserted into the lower end portion of the coil spring 48 formed in a circular shape when the reading apparatus body 50 is accommodated in the accommodation member 30.

Furthermore, spacers 60 as an example of the positioning member are respectively mounted on both end portions of the reading apparatus body 50 in the longitudinal direction. As illustrated in FIG. 4 and FIGS. 6 to 8, each spacer 60 is formed in a substantially U shape when viewed in the longitudinal direction (front-rear direction) of the reading apparatus body 50 and a pair of leg sections 62 are bent away to the center portion side from the front wall 50A and the rear wall 50B (engaging section 70 described below) of the reading apparatus body 50 in the longitudinal direction when viewed in the main scanning direction (left-right direction).

Then, hook sections 63 as an example of the locking section are respectively formed in the lower end portion of the pair of leg sections 62. Moreover, as illustrated in FIGS. 5 and 6, cutout sections 53 as an example of the locked section into which the hook section 63 is locked are respectively formed in the lower end portion in a left wall 50D (see FIG. 7) and the right wall 50C of the reading apparatus body 50.

Furthermore, upper end portions of the pair of leg sections 62 are integrally connected by a rectangular plate-shaped connection section 64 in which the width direction (left-right direction and main scanning direction) of the reading apparatus body 50 is the longitudinal direction. Then, cylindrical boss sections 68 inserting into boss holes 58 formed in both end portions of the upper portion of the reading apparatus body 50 in the longitudinal direction integrally protrude in the lower surface of the connection section 64 with a predetermined gap in the width direction (left-right direction and main scanning direction) of the reading apparatus body 50.

Thus, as illustrated in FIG. 5, each boss section 68 is inserted into each boss hole 58 and each hook section 63 formed in the lower end portion of the pair of leg sections 62 is locked into each cutout section 53 formed in the reading apparatus body 50 and thereby a pair of the spacers 60 provided front and rear sides are respectively mounted on both end portions of the reading apparatus body 50 in the longitudinal direction.

Figure 8:
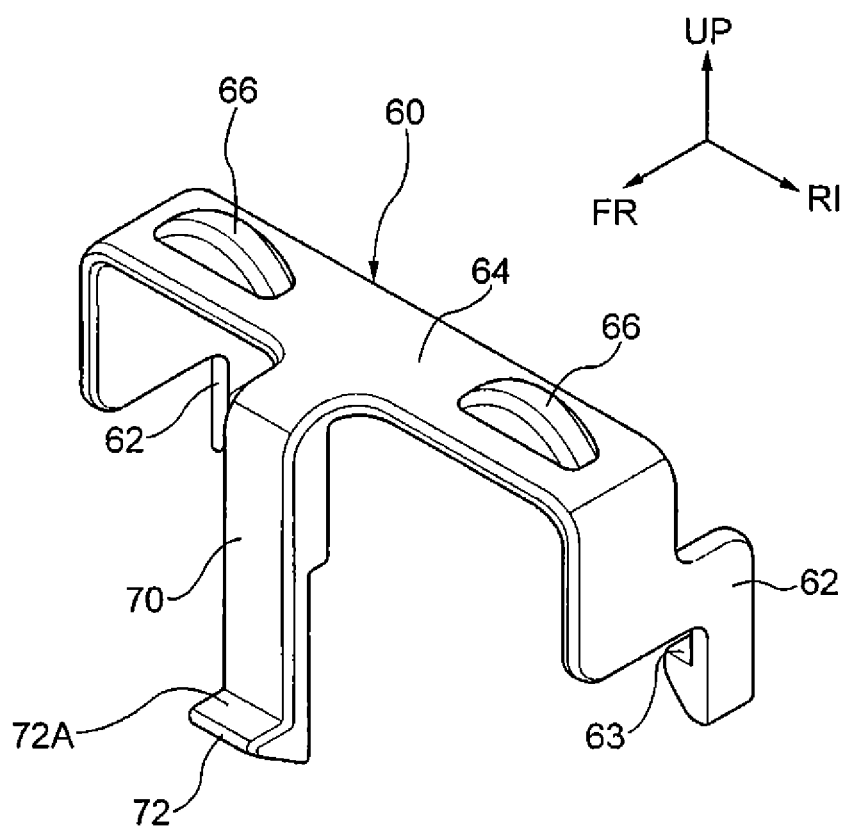
FIG. 8 is a perspective view of a spacer.

Furthermore, as illustrated in FIGS. 7 and 8, convex sections 66 having semi-circular (substantially semi-circular plate-shaped) when viewed in the longitudinal direction (front-rear direction) of the reading apparatus body 50 integrally protrude on the upper surface of the connection section 64 with a predetermined gap in the width direction (left-right direction and main scanning direction) of the reading apparatus body 50 (the convex section 66 is formed on the opposite side on the surface and rear surface of the boss section 68).

Then, as illustrated in FIG. 3, the pair of convex sections 66 slidably come into contact with the rear surface of the document platen 14 with a predetermined pressure (a biasing force of the coil spring 48 described below) in the main scanning direction and the returning direction. Thus, the spacer 60 is molded with polyacetal (POM) that is an example of a resin material having excellent slidability with respect to the document platen 14.

Furthermore, as illustrated in FIGS. 4 to 8, the engaging section 70 extending to the lower side is integrally formed in the center portion of a peripheral portion of one side (outside of the reading apparatus body 50 in the longitudinal direction) in the left-right direction in the connection section 64 of the spacer 60. The engaging sections 70 are respectively disposed facing the front wall 50A and the rear wall 50B of the reading apparatus body 50 and the height thereof is higher than the height of the reading apparatus body 50.

That is, the lower end portion of the engaging section 70 protrudes to the lower side further than the lower surface of the reading apparatus body 50. Then, a plate thickness of the engaging section 70 on the lower side from an intermediate portion thereof is formed thinner than the plate thickness on the upper side thereof. Thus, the lower end portion of the engaging section 70 protruding to the lower side further than the lower surface of the reading apparatus body 50 can be elastically deformed in the front-rear direction. The lower end portion (hook section 72 described below) of the engaging section 70 can be engaged with the opening section 44 of the accommodation member 30 in the height direction.

When describing in detail, the hook section 72 protruding to the outside of the reading apparatus body 50 in the longitudinal direction is formed in the lower end portion of the engaging section 70 and an upper surface 72A of the hook section 72 is an inclined surface inclined obliquely upward to the outside. Meanwhile, a lower surface 44A is also an inclined surface inclined obliquely upward to the outside in a peripheral portion on the upper side of the opening section 44 facing the upper surface 72A of the hook section 72 (see FIG. 5). Thus, even if the spacer 60 is inclined in the front-rear direction (longitudinal direction of the reading apparatus body 50), the hook section 72 is unlikely to come off from the opening section 44.

Furthermore, as illustrated in FIG. 6, in the front wall 50A and the rear wall 50B of the reading apparatus body 50, the protrusion sections 56 are formed in positions opposite to the inserting section 54 across the engaging section 70 and in the vicinity of the engaging sections 70. That is, a slight gap S is formed between the engaging section 70 and the protrusion section 56.

Then, as illustrated in FIG. 9, the sheet plate-shaped ribs 46 as an example of the guide section are formed in positions in the vicinity of the opening section 44 in the inner surface of the front wall 30A and the rear wall 30B of the accommodation member 30 along the height direction. The plate thickness of the rib 46 is formed to be equal to or slightly smaller than the width of the gap S.

Thus, when the reading apparatus body 50 is accommodated in the accommodation member 30, the rib 46 is inserted into the gap S between the engaging section 70 and the protrusion section 56, and the reading apparatus body 50 is accommodated in the accommodation member 30 while the engaging section 70 and the protrusion section 56 are guided by the rib 46.

Furthermore, as illustrated in FIGS. 5 and 6, the coil springs 48 as an example of the biasing member are provided between both end portions of the lower surface of the reading apparatus body 50 and both end portions of the upper surface (bottom surface) of the bottom wall 32 of the accommodation member 30. When describing in detail, the upper end portions of a pair of coil springs 48 provided in the front and rear sides are mounted on both end portions of the lower surface of the reading apparatus body 50 and when the reading apparatus body 50 is accommodated in the accommodation member 30, the lower end portions thereof are fitted into the boss sections 33 protruding to both end portions of the upper surface (bottom surface) of the bottom wall 32 of the accommodation member 30.

Moreover, as illustrated in FIG. 7, each coil spring 48 is disposed in a position (preferably the same position) overlapping the lower end portion of each engaging section 70 when viewed in the longitudinal direction of the reading apparatus body 50. That is, each engaging section 70 is disposed in a position close to each other with respect to each coil spring 48. Furthermore, as illustrated in FIG. 5, each coil spring 48 is disposed directly below each convex section 66 when viewed in the main scanning direction. In other words, each convex section 66 is disposed directly above each coil spring 48 when viewed in the main scanning direction.

In the image reading apparatus 10 including the spacer 60 having such a configuration described above, next, an operation (an assembling method of the reading apparatus body 50 into the accommodation member 30) thereof will be described.

First, the upper end portions of the pair of coil springs 48 provided on the front and rear sides are respectively mounted on both end portions of the lower surface of the reading apparatus body 50. Then, a pair of spacers 60 provided on the front and rear sides are respectively mounted on both end portions of the reading apparatus body 50 in the longitudinal direction. That is, the boss section 68 of each spacer 60 is inserted into the boss hole 58 of the reading apparatus body 50 and the hook section 63 in the leg section 62 is locked into the cutout section 53 of the reading apparatus body 50.

Here, the cutout sections 53 of the reading apparatus body 50 are respectively formed in a position away from the front wall 50A and the rear wall 50B. Then, the hook section 63 of the spacer 60 in the leg section 62 is formed in a position away from the engaging section 70. Thus, when inserting the reading apparatus body 50 into the accommodation member 30, even if a force is relatively applied so as to press the engaging section 70 to the upper side, inclination of the engaging section 70 is suppressed by the hook section 63 locked into the cutout section 53. Thus, the hook section 63 is suppressed or prevented from coming off from the cutout section 53.

The coil spring 48 and the spacer 60 are mounted on the reading apparatus body 50 and then the reading apparatus body 50 is accommodated in the accommodation member 30. That is, the reading apparatus body 50 is inserting into the accommodation member 30 from above while the engaging section 70 (the hook section 72) of each spacer 60 is elastically deformed to the side of the front wall 50A and the rear wall 50B of the reading apparatus body 50 by the front wall 30A and the rear wall 30B of the accommodation member 30 and while the rib 46 of the accommodation member 30 is inserted into the gap S between the protrusion section 56 of the reading apparatus body 50 and the engaging section 70.

Here, the lower end portion (the hook section 72) of the engaging section 70 protrudes to the lower side further than the lower surface of the reading apparatus body 50. Thus, since the lower end portion (the hook section 72) of the engaging section 70 is guided by the rib 46 at an early stage (earlier than the protrusion section 56) as the reading apparatus body 50 is inserted into the accommodation member 30, the guidance is improved when the reading apparatus body 50 is inserted into the accommodation member 30.

Then, the engaging section 70 and the protrusion section 56 are guided by the rib 46 and thereby the guidance is further improved and the reading apparatus body 50 is vertically inserted into the bottom wall 32 of the accommodation member 30. Furthermore, the lower end portion of the engaging section 70 is disposed in a position (preferably in the same position) overlapping the coil spring 48 when viewed in the longitudinal direction of the reading apparatus body 50.

That is, the engaging section 70 is disposed in the vicinity of the coil spring 48. Thus, when the reading apparatus body 50 is inserted into the accommodation member 30, a positioning property of the coil spring 48 is also improved with respect to the boss section 33. Thus, the lower end portion of the coil spring 48 is easily assembled (fitted) into the boss section 33 of the accommodation member 30.

Furthermore, when the reading apparatus body 50 is accommodated in the accommodation member 30, each of the inserting sections 54 and 55 of the reading apparatus body 50 is inserted into each of the cutout sections 42 and 43 of the accommodation member 30 almost without a gap. Here, the reading apparatus body 50 and the accommodation member 30 are molded from a resin material including glass and have a high rigidity (strength). Therefore, each of the inserting sections 54 and 55 is inserted into each of the cutout sections 42 and 43 and thereby the positions of the reading apparatus body 50 with respect to the accommodation member 30 in the left-right direction (main scanning direction) and the front-rear direction (longitudinal direction) are positioned with a high accuracy.

Thus, the reading apparatus body 50 is accommodated in the accommodation member 30 while assembling (while engaging) the lower end portion of the coil spring 48 in the boss section 33 and then the hook section 72 of the engaging section 70 is inserted into the opening section 44 of the accommodation member 30 by an elastic restoring force. Thus, the reading apparatus body 50 is mounted on the accommodation member 30. Therefore, for example, even if the accommodation member 30 in which the reading apparatus body 50 is accommodated falls down when manufacturing the image reading apparatus 10, the reading apparatus body 50 is prevented from falling from the accommodation member 30 by the hook section 72 being engaged with the opening section 44 in the height direction.

Furthermore, the upper surface 72A of the hook section 72 is the inclined surface inclined obliquely upward to the outside and the lower surface 44A of the opening section 44 facing the upper surface 72A of the hook section 72 in the upper peripheral portion is also the inclined surface inclined obliquely upward to the outside. Thus, when the accommodation member 30 into which the reading apparatus body 50 is accommodated falls, the hook section 72 is prevented from coming off from the opening section 44 even if the spacer 60 is inclined in the front-rear direction (longitudinal direction of the reading apparatus body 50).

Furthermore, since the convex section 66 of each spacer 60 is disposed directly above each coil spring 48 when viewed in the main scanning direction, the convex section 66 thereof comes into contact with the rear surface of the document platen 14 by being effectively biased upward by the biasing force (elastic restoring force) of each coil spring 48. Thus, the position of the reading apparatus body 50 in the height direction is positioned with a high accuracy with respect to the document platen 14 by each convex section 66. Moreover, since a tolerance (dimensional error in the mold of the glass plate) in the rear surface of the document platen 14 with which each convex section 66 comes into contact is allowed, the upper surface 72A of the hook section 72 does not come into contact with the lower surface 44A of the opening section 44 in the upper peripheral portion.

As described above, in the image reading apparatus 10 according to the first exemplary embodiment, the reading apparatus body 50 is prevented from falling from the accommodation member 30 by the spacer 60 performing the positioning of the reading apparatus body 50 with respect to the document platen 14 in the height direction. That is, it is possible to realize the positioning of the reading apparatus body 50 with respect to the document platen 14 and prevention of the reading apparatus body 50 from falling from the accommodation member 30 with a simple configuration.

Furthermore, in order to prevent the reading apparatus body 50 from falling from the accommodation member 30, for example, if a hook section (not illustrated) that is elastically deformed is formed in the reading apparatus body 50 or the accommodation member 30, since the reading apparatus body 50 or the accommodation member 30 is molded with the resin material including glass, there is a concern that the reading apparatus body 50 or the accommodation member 30 may not withstand the elastic deformation when the hook section is elastically deformed. That is, there is a concern that cracking may occur in the reading apparatus body 50 or the accommodation member 30 based on the hook section.

However, in the image reading apparatus 10 according to the first exemplary embodiment, since the hook section 72 (the engaging section 70) for preventing the falling is formed not in the reading apparatus body 50 or the accommodation member 30 but in the spacer 60 mounted on the reading apparatus body 50, there is no concern that cracking may occur in the reading apparatus body 50 or the accommodation member 30.

Furthermore, since the spacer 60 is a part smaller than the reading apparatus body 50 or the accommodation member 30, a mold for molding is easily manufactured and even if replacement thereof is necessary due to breakage of the hook section 72 and the like, it is possible to easily replace the hook section 72. Thus, the image reading apparatus 10 according to the first exemplary embodiment is also advantageous in terms of cost.

Above, the image reading apparatus 10 according to the first exemplary embodiment is described with reference to the drawings, but the image reading apparatus 10 according to the first exemplary embodiment is not limited to the illustrated example, and a design thereof may be appropriately changed without departing from the gist of the invention. For example, shapes of the inserting sections 54 and 55 or the protrusion section 56 are not limited to the illustrated shapes. Furthermore, the inserting section 54 or the protrusion section 56 is not limited to the configuration of being formed symmetrically in the front and rear sides.

Hereinafter, a second exemplary embodiment of the invention will be described in detail with reference to the drawings. Moreover, in each view, arrow UP is referred to as an upper direction of an image reading apparatus 10' and arrow FR is referred to as a front direction of the image reading apparatus 10'. Then, arrow RI is referred to as a right direction in an image reading apparatus 10' and is referred to as a main scanning direction (moving direction of an accommodation member 30) when a reading apparatus body 50 reads a document mounted on a document platen 14. Furthermore, in the document mounted on the document platen 14, a left-right direction is a longitudinal direction.

Figure 10:
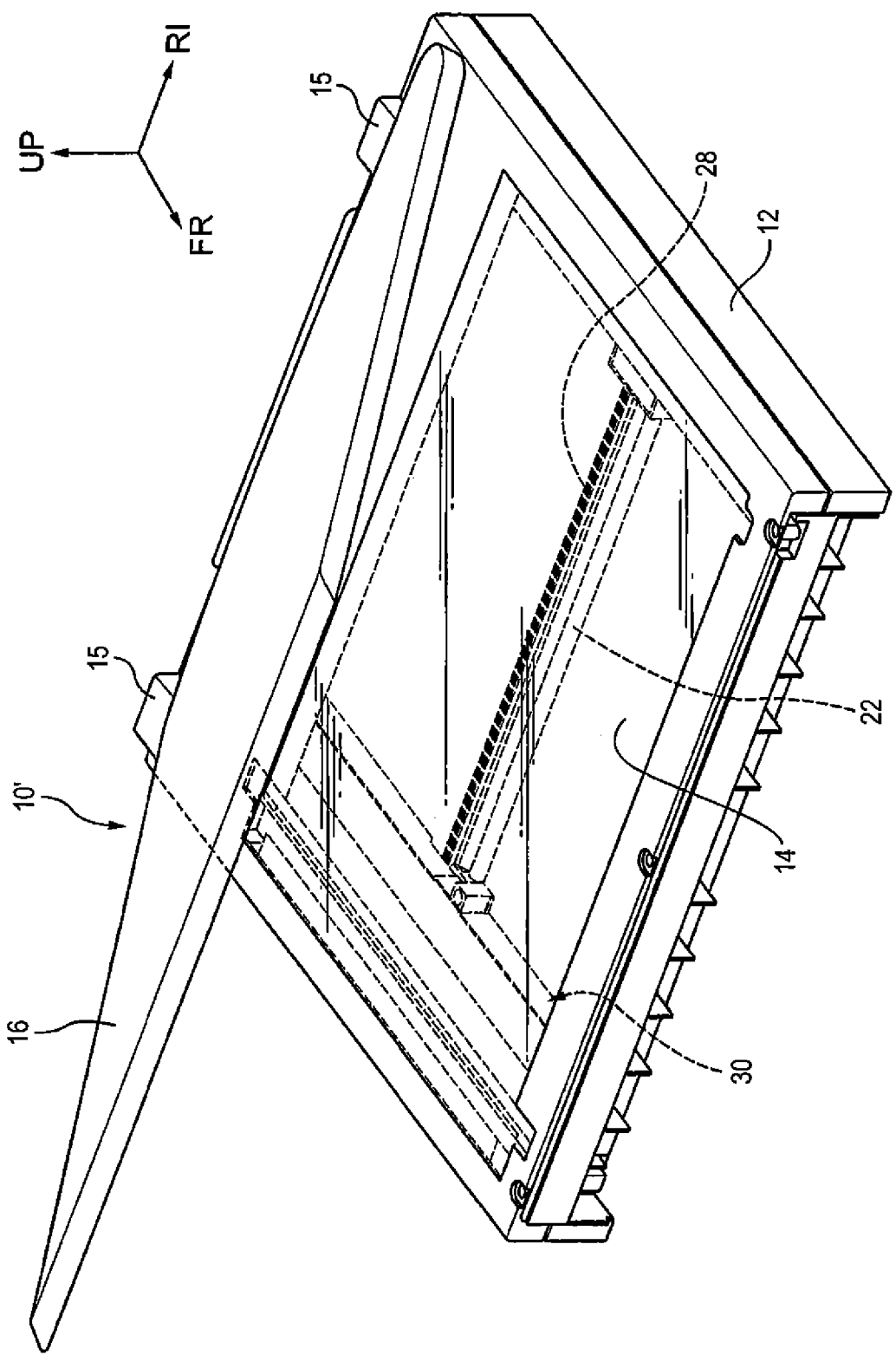
FIG. 10 is a perspective view illustrating an image reading apparatus.

As illustrated in FIG. 10, the image reading apparatus 10' has the document platen 14 on a side of an upper portion of a case 12, on which a document is mounted. The document platen 14 is a transparent glass plate formed in a rectangular shape in which a left-right direction is a longitudinal direction and is open and closed by a cover 16. The cover 16 is formed in a rectangular shape slightly larger than the document platen 14 and is openably and closably configured in an up-down direction by a pair of left and right hinge sections 15 on a rear portion side of the case 12.

Figure 11:
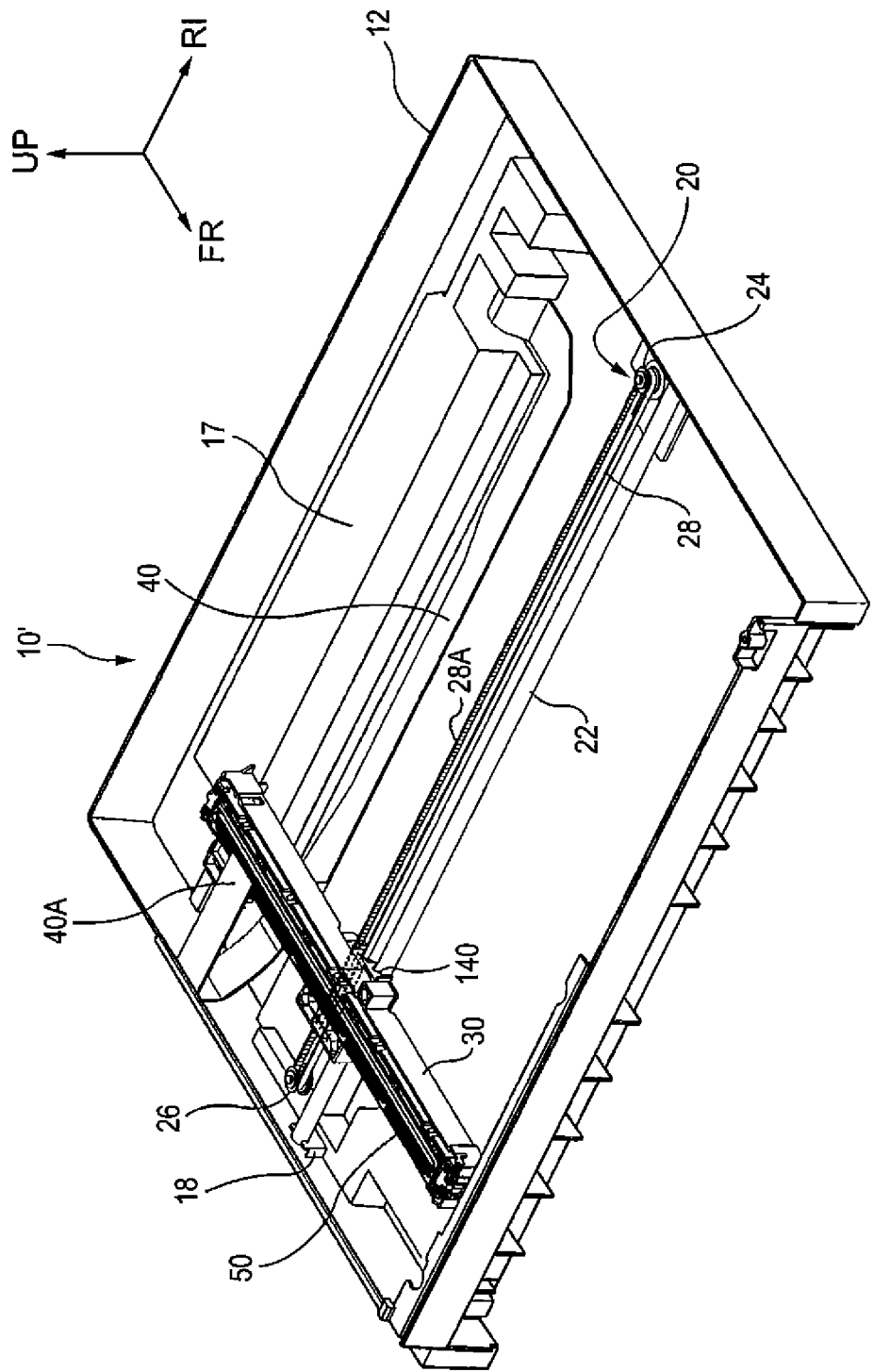
FIG. 11 is a perspective view illustrating an inside of the image reading apparatus.
Figure 13:
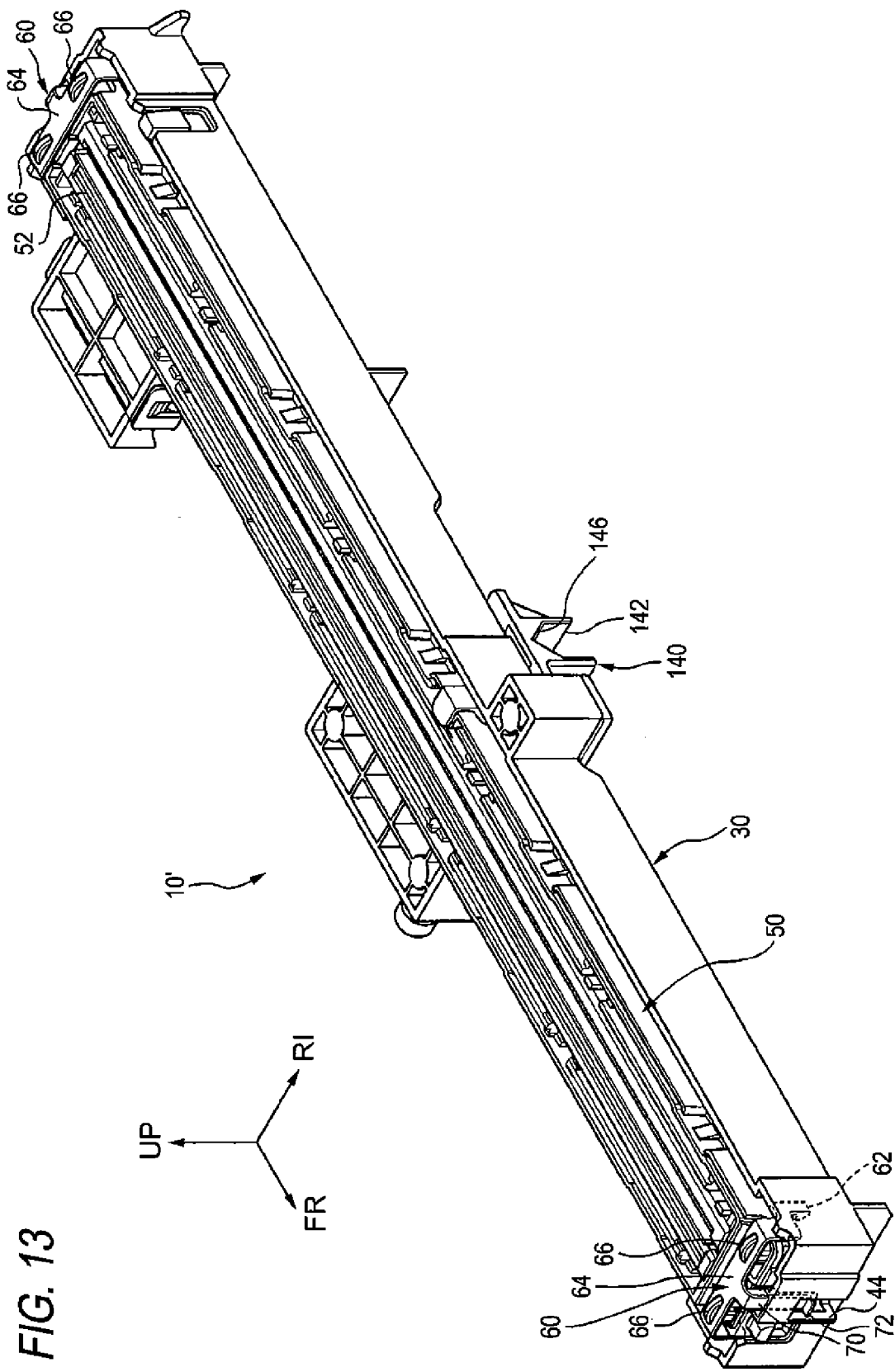
FIG. 13 is a perspective view illustrating an accommodation member accommodating a reading apparatus body.

As illustrated in FIG. 11, the reading apparatus body (CIS unit) 50 reading the document mounted on the document platen 14 while moving in the main scanning direction (from one end portion of the document to the other end portion in the longitudinal direction of the document) is provided on the inside (lower side of the document platen 14) of the case 12. As illustrated in FIG. 13, the reading apparatus body 50 has a length that is equal to or more than a length of a document in a lateral direction (direction orthogonal to the longitudinal direction of the document). A reading section 52 is provided along the longitudinal direction (extending in the longitudinal direction) of the reading apparatus body 50 in the upper portion of the reading apparatus body 50 and in the center portion in the width direction (left-right direction and main scanning direction).

Then, the reading apparatus body 50 is inserted into and accommodated in the accommodation member (carriage housing) 30 from above. The accommodation member 30 is a case in which the front-rear direction (direction orthogonal to the main scanning direction in a plan view) is the longitudinal direction (length that is a length of a document or more in a lateral direction) and both end portions in the longitudinal direction are movably supported on a the support platen 17 (see FIG. 11) integrally formed in the case 12.

Figure 12:
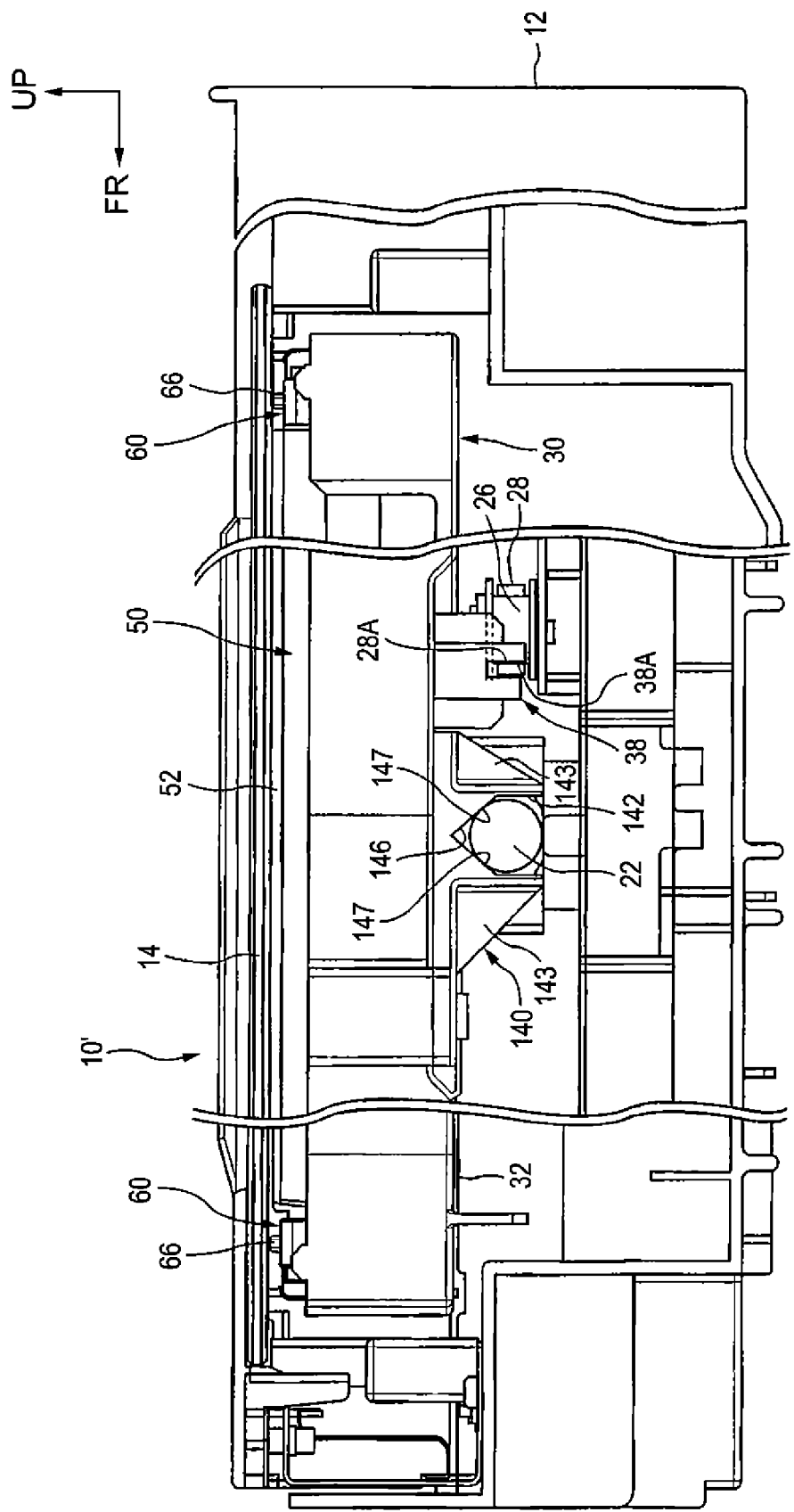
FIG. 12 is an enlarged cross-sectional view illustrating the inside of the image reading apparatus when being partially omitted.
Figure 14:
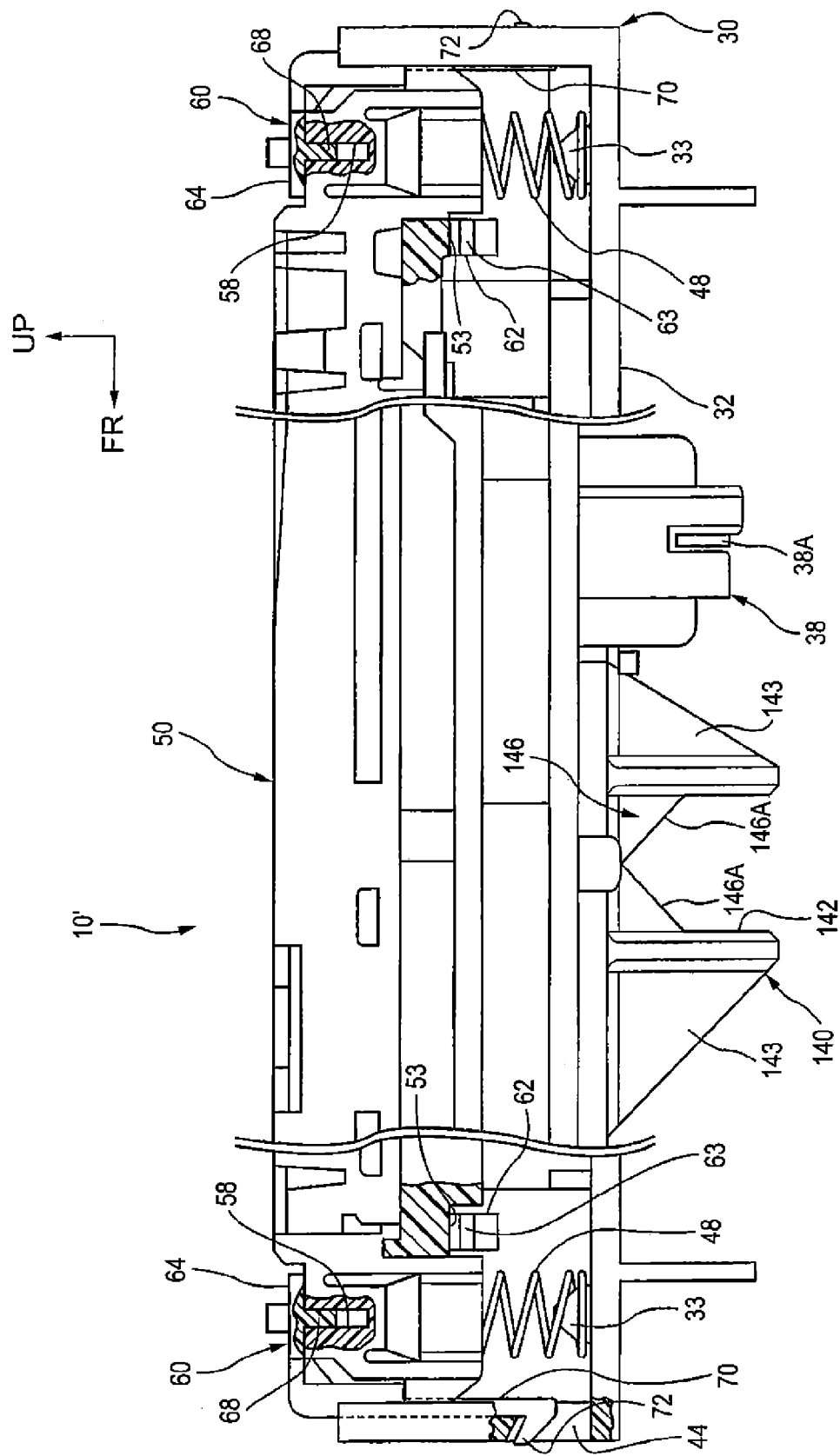
FIG. 14 is an enlarged cross-sectional view illustrating the accommodation member accommodating the reading apparatus body when being partially omitted.

Then, as illustrated in FIGS. 12 to 14, a guide member 140 as an example of a guided member that is guided by being supported on a metal shaft 22 described below is mounted on a substantially center portion of a the bottom wall 32 of the accommodation member 30 in the longitudinal direction on the lower surface side. Moreover, the guide member 140 will be described below.

Furthermore, an opening section 44 as an example of an engaged section with which an engaging section 70 of a spacer 60 described below is capable of engaging in a height direction (up-down direction) is formed in a substantially center lower portion of a front wall and a rear wall of the accommodation member 30 in the left-right direction. The opening section 44 is formed in a rectangular shape in which the height direction is the longitudinal direction.

Furthermore, as illustrated in FIG. 14, boss sections 33 into which lower end portions of coil springs 48 described below are fitted protrude in both end portions of the upper surface (bottom surface) of the bottom wall 32 on the inside of the accommodation member 30 in the longitudinal direction more than the opening section 44 and in a substantially center portion in the left-right direction. The boss section 33 is formed in a cross shape in a plan view and is inserted into the lower end portion of the coil spring 48 formed in a circular shape when the reading apparatus body 50 is accommodated in the accommodation member 30.

The spacers 60 as an example of the positioning member are respectively mounted on both end portions of the reading apparatus body 50 accommodated in the accommodation member 30 in the longitudinal direction. Each spacer 60 has a pair of leg sections 62 (see FIG. 13) and hook sections 63 as an example of a locking section are respectively formed in the lower end portion of the pair of leg sections 62. Then, cutout sections 53 as an example of the locked section into which the hook section 63 is locked are respectively formed in the lower end portion in a left wall and a right wall of the reading apparatus body 50.

Furthermore, as illustrated in FIGS. 13 and 14, upper end portions of the pair of leg sections 62 are integrally connected by a rectangular plate-shaped connection section 64. Then, cylindrical boss sections 68 inserting into boss holes 58 formed in both end portions of the upper portion of the reading apparatus body 50 in the longitudinal direction integrally protrude in the lower surface of the connection section 64 with a predetermined gap in the width direction (left-right direction and main scanning direction) of the reading apparatus body 50.

Thus, as illustrated in FIG. 14, each boss section 68 is inserted into each boss hole 58 and each hook section 63 formed in the lower end portion of the pair of leg sections 62 is locked into each cutout section 53 formed in the reading apparatus body 50 and thereby a pair of the spacers 60 provided front and rear sides are respectively mounted on both end portions of the reading apparatus body 50 in the longitudinal direction.

Furthermore, as illustrated in FIG. 13, convex sections 66 having a semi-circular shape (substantially semi-circular plate shape) when viewed in the longitudinal direction (front-rear direction) of the reading apparatus body 50 integrally protrude on the upper surface of the connection section 64 with a predetermined gap in the width direction (left-right direction and main scanning direction) of the reading apparatus body 50 (the convex section 66 is formed on the opposite side on the surface and rear surface of the boss section 68).

The pair of convex sections 66 slidably come into contact with the rear surface of the document platen 14 with a predetermined pressure (a biasing force of the coil spring 48 described below) in the main scanning direction and the returning direction (see FIG. 12). Thus, the spacer 60 is molded from polyacetal (POM) that is an example of a resin material having excellent slidability with respect to the document platen 14.

Furthermore, as illustrated in FIGS. 13 and 14, the engaging section 70 extending to the lower side is integrally formed in the center portion of a peripheral portion of one side (outside of the reading apparatus body 50 in the longitudinal direction) in the left-right direction in the connection section 64 of the spacer 60. The engaging sections 70 are respectively disposed facing the front wall and the rear wall of the reading apparatus body 50 and the height thereof is higher than the height of the reading apparatus body 50.

That is, the lower end portion (hook section 72 described below) of the engaging section 70 protrudes to the lower side further than the lower surface of the reading apparatus body 50. Then, a plate thickness of the engaging section 70 on the lower side from an intermediate portion thereof is formed thinner than the plate thickness on the upper side thereof. Thus, the lower end portion of the engaging section 70 protruding to the lower side further than the lower surface of the reading apparatus body 50 can be elastically deformed in the front-rear direction. The lower end portion of the engaging section 70 can be engaged with the opening section 44 of the accommodation member 30 in the height direction.

When describing in detail, the hook section 72 protruding to the outside of the reading apparatus body 50 in the longitudinal direction is formed in the lower end portion of the engaging section 70 and the hook section 72 is engaged with the peripheral portion of the opening section 44 on the upper side when accommodating the reading apparatus body 50 into the accommodation member 30. Therefore, for example, even if the accommodation member 30 into which the reading apparatus body 50 is accommodated falls down when manufacturing the image reading apparatus 10', the reading apparatus body 50 is suppressed or prevented from falling from the accommodation member 30.

Furthermore, as illustrated in FIG. 14, the coil springs 48 as an example of the biasing member are provided between both end portions of lower surface of the reading apparatus body 50 and both end portions of the upper surface (bottom surface) of the bottom wall 32 of the accommodation member 30. When describing in detail, the upper end portions of a pair of coil springs 48 provided in the front and rear sides are mounted on both end portions of the lower surface of the reading apparatus body 50 and when the reading apparatus body 50 is accommodated in the accommodation member 30, the lower end portions thereof are fitted into the boss sections 33 protruding to both end portions of the upper surface (bottom surface) of the bottom wall 32 of the accommodation member 30.

Moreover, each coil spring 48 is disposed directly below each convex section 66 when viewed in the main scanning direction. In other words, each convex section 66 is disposed directly above each coil spring 48 when viewed in the main scanning direction. Thus, each spacer 60 comes into contact with the rear surface of the document platen 14 by being effectively biased upward by the biasing force (elastic restoring force) of each coil spring 48. Thus, the position of the reading apparatus body 50 in the height direction is positioned with a high accuracy with respect to the document platen 14 by each convex section 66.

Furthermore, as illustrated in FIG. 11, the moving mechanism 20 moving the reading apparatus body 50 (the accommodation member 30) in the main scanning direction is provided on the inside of the case 12. When describing in detail, the moving mechanism 20 has the shaft 22 as an example of a cylindrical guide member that is provided in which the left-right direction (main scanning direction) is the axial direction in a substantially center portion inside the case 12 in the front-rear direction. Both left and right end portions of the shaft 22 are fixed to a support section 18 integrally formed with both left and right end portions inside the case 12 and the shaft 22 movably supports the accommodation member 30 in which the reading apparatus body 50 is accommodated in the main scanning direction (right direction) and in a returning direction (left direction) opposite to the main scanning direction.

Furthermore, the moving mechanism 20 has a timing belt 28 and a driving motor (not illustrated). The timing belt 28 is wound around a timing pulley 24 provided on a side of a right end portion (one end portion of the shaft 22 in the axial direction) inside the case 12 and a timing pulley 26 provided on a side of a left end portion (the other end portion of the shaft 22 in the axial direction) inside the case 12 so as to mesh meshing teeth 28A formed on an inner peripheral surface therewith. The driving motor is coaxially provided with the timing pulley 24 of one side (for example, the right side) and rotates the timing pulley 24 in both forward and reverse directions.

Thus, the timing pulley 24 is rotated in both forward and reverse directions by the driving of the driving motor and thereby one side of front and rear sides of the timing belt 28 moves in the main scanning direction and the other side of the front and rear sides moves in the returning direction. That is, one side of front and rear sides and the other side of the front and rear sides of the timing belt 28 move in opposite directions in synchronization with each other. Then, for example, the accommodation member 30 is mounted on the timing belt 28 of the front side.

When describing in detail, as illustrated in FIGS. 12 and 14, a meshing section 38 as an example of the fixing section meshing with the meshing teeth 28A of the timing belt 28 is integrally formed in a substantially center portion (rear side of the guide member 40) in the longitudinal direction on the lower surface side of the bottom wall 32 in the vicinity of the guide member 40. The meshing section 38 is formed in a rectangular block shape and a gap equal to or greater than a thickness of the timing belt 28 is formed in the center portion of the lower end thereof. Then, meshing teeth 38A are formed on an inner surface of the meshing section 38 on one side (rear side in the second exemplary embodiment) in the gap.

Thus, as illustrated in FIG. 12, a front side of the timing belt 28 is inserted into the gap of the meshing section 38. The meshing teeth 28A on the front side thereof mesh with the meshing teeth 38A and thereby the accommodation member 30 is fixed to the timing belt 28 through the meshing section 38 in a circumferential direction thereof. Thus, the accommodation member 30 moves in the main scanning direction and the returning direction while being supported by the shaft 22 and the support platen 17 according to the movement of the timing belt 28.

Moreover, as illustrated in FIG. 11, a flexible cable 40 for transmitting image data read by the reading apparatus body 50 is disposed in the case 12 on the rear side further than the timing belt 28. One end portion 40A of the flexible cable 40 is connected to the reading apparatus body 50. Then, the flexible cable 40 is capable of following the movement of the accommodation member 30 into which the reading apparatus body 50 is accommodated.

First Example

Here, the guide member 140 according to a first example will be described in detail. As illustrated in FIGS. 12 to 14, the guide member 140 is molded from polyacetal (POM) that is an example of a resin material having excellent slidability with respect to the shaft 22 and is mounted in the substantially center portion in the longitudinal direction on the lower surface side of the bottom wall 32 of the accommodation member 30 by fasteners such as screws (not illustrated). Thus, as illustrated in FIG. 15, hole sections 141 through which the fasteners such as screws pass are formed in a predetermined plurality (for example, four) of positions in the guide member 40.

Figure 15:
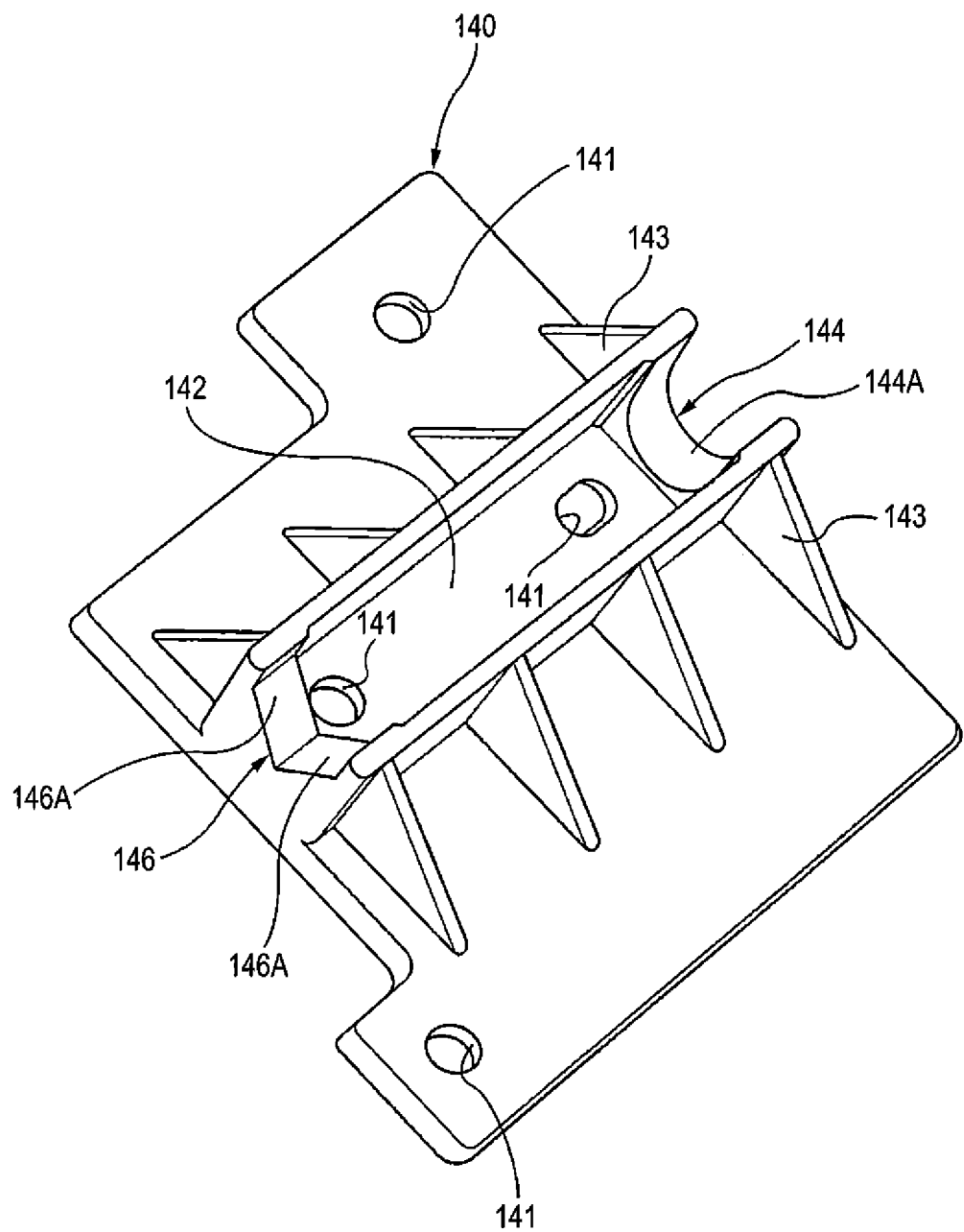
FIG. 15 is a perspective view illustrating a guide member according to a first example.
Figure 16A:
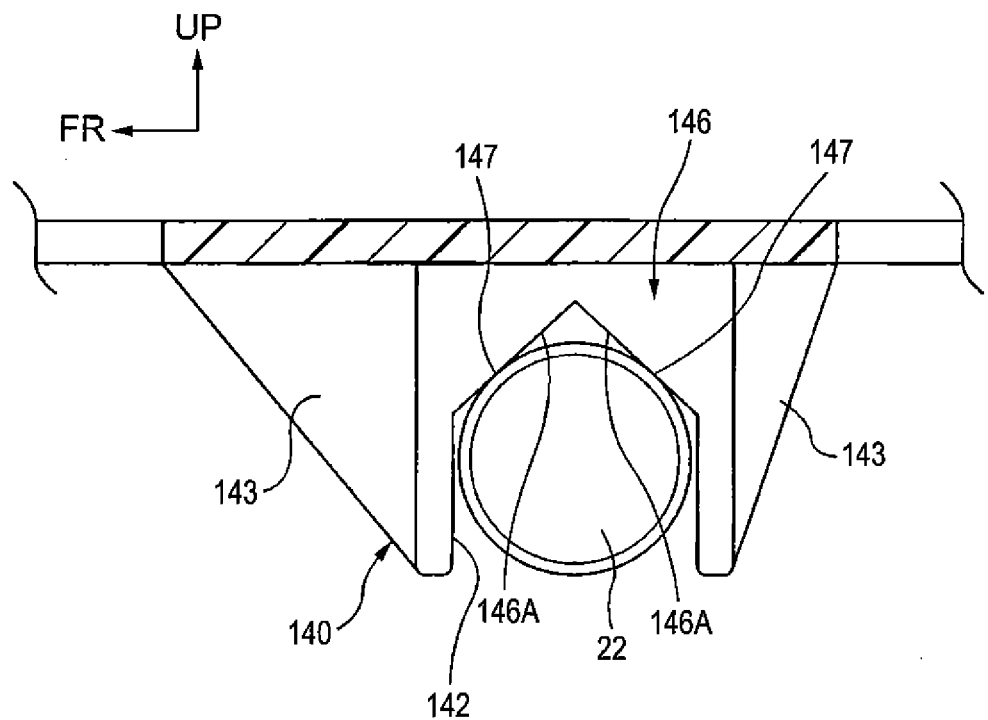
FIG. 16A is a side view illustrating a flat contact section of the guide member according to the first example.
Figure 16B:
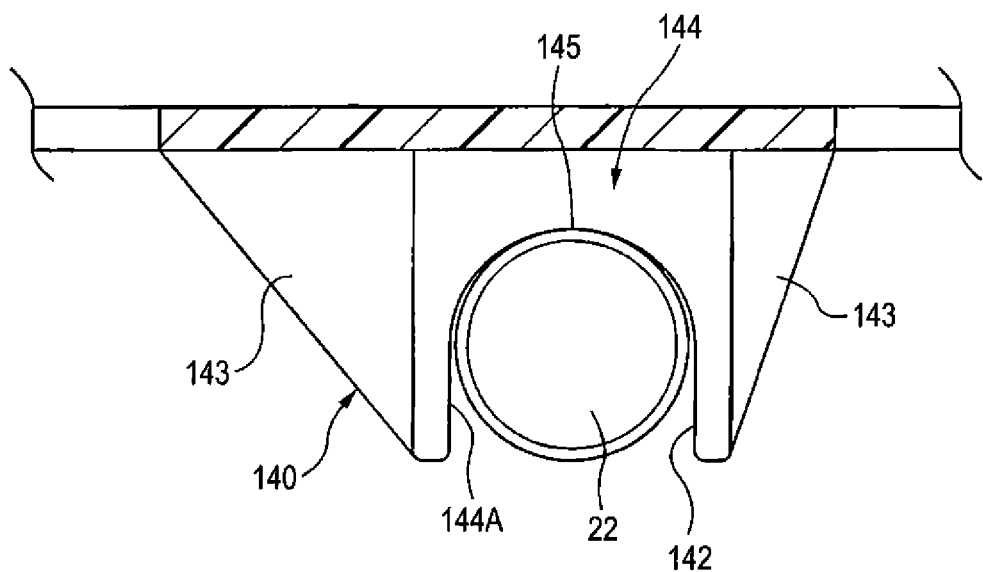
FIG. 16B is a side view illustrating a curved surface contact section of the guide member according to the first example.

Furthermore, a concave groove section 142 extending in the axial direction of the shaft 22 is formed in the guide member 140 and as illustrated in FIGS. 15 and 16B, a first receiving section 144 that is a substantially inverted U shape when viewed in the main scanning direction is integrally formed in the end portion on the upstream side in the main scanning direction inside the concave groove section 42. Then, as illustrated in FIGS. 12 and 14 to 16A, a second receiving section 146 that is a substantially inverted V shape when viewed in the main scanning direction is integrally formed in the end portion on the downstream side in the main scanning direction inside the concave groove section 42.

The first receiving section 144 and the second receiving section 146 inside the concave groove section 142 are respectively mounted on the outer peripheral surface of the shaft 22 from above and thereby a substantially center portion of the accommodation member 30 in the longitudinal direction is supported on the shaft 22. Then, as illustrated in FIG. 16B, the first receiving section 144 has a curved surface contact section 145 coming into contact with the outer peripheral surface of the shaft 22 at one point in the circumferential direction when viewed in the main scanning direction. As illustrated in FIG. 16A, the second receiving section 146 has a pair of flat contact sections 147 coming into contact with the outer peripheral surface of the shaft 22 at two points in the circumferential direction when viewed in the main scanning direction.

When describing in detail, as illustrated in FIGS. 15 and 16B, the first receiving section 144 has a circular arc surface 144A having a curvature (having a radius of curvature greater than a radius of curvature of the shaft 22) less than a curvature of the shaft 22 when viewed in the main scanning direction and the uppermost end portion in the circular arc surface 144A is the curved surface contact section 145 coming into contact with the uppermost end portion in the outer peripheral surface of the shaft 22.

Meanwhile, as illustrated in FIGS. 15 and 16A, the second receiving section 146 is inclined at a predetermined angle and has a pair of inclined surfaces 146A that are line symmetrical with respect to a straight line in a vertical direction passing through the center of the shaft 22 when viewed in the main scanning direction. A part of each inclined surface 146A is the flat contact section 147 coming into contact with the outer peripheral surface of the shaft 22 on the upper portion side.

Furthermore, as illustrated in FIG. 15, a plurality (for example, eight) of ribs 143 for reinforcing the concave groove section 142 (the first receiving section 144 and the second receiving section 46) are integrally formed in the guide member 140 on the outside of the concave groove section 42. Moreover, as illustrated in FIGS. 16A and 16B, each rib 143 is formed in a right triangular shape, but is not limited to this shape.

Furthermore, the timing belt 28 is preferably as close to the shaft 22 as possible to improve accuracy of the movement of the accommodation member 30. Thus, as illustrated in FIGS. 12 and 14, the ribs 143 on the side (rear side) on which the timing belt 28 is arranged are formed smaller than the rib 143 on the opposite side (front side) thereof so as not to interfere with the meshing section 38.

In the image reading apparatus 10' including the guide member 140 according to the first example configured as described above, next, an operation (movement of reading apparatus body 50 (the accommodation member 30) in the main scanning direction) will be described.

The document is mounted on the document platen 14 and the cover 16 is closed, and then an operation panel (not illustrated) is operated, and thereby reading of the document is started. That is, the accommodation member 30 into which the reading apparatus body 50 is accommodated moves in the main scanning direction. Here, the second receiving section 146 is formed in the end portion on the downstream side in the main scanning direction of the guide member 40. The pair of flat contact sections 147 in the second receiving section 146 respectively come into point contact with the outer peripheral surface of the shaft 22 when viewed in the main scanning direction (see FIG. 16A).

That is, the second receiving section 146 comes into contact with the shaft 22 through the pair of flat contact sections 147 at two points in the circumferential direction. Thus, the guide member 140 (second receiving section 46) is supported on the shaft 22 with high positional accuracy (without deviation in a direction intersecting the axial direction of the shaft 22 in a plan view). Thus, the looseness (vibration) of the reading apparatus body 50 (the accommodation member 30) is suppressed or prevented when moving along the shaft 22 in the main scanning direction.

Furthermore, the first receiving section 144 is formed in the end portion of the guide member 140 on the upstream side in the main scanning direction and the curved surface contact section 145 in the first receiving section 144 comes into contact with the outer peripheral surface of the shaft 22 at one point in the circumferential direction when viewed in the main scanning direction (see FIG. 16B). Thus, even if the position in a direction intersecting the axial direction of the shaft 22 deviates in the first receiving section 144 and the second receiving section 146 due to error in the molding of the guide member 40, the deviation thereof is allowed by the first receiving section 44.

In other words, even if the position in the direction intersecting the axial direction of the shaft 22 deviates in the first receiving section 144 and the second receiving section 146 due to error in the molding of the guide member 40, the guide member 140 (the accommodation member 30) is not inclined with respect to the shaft 22 in a plan view. Thus, the looseness (vibration) of the reading apparatus body 50 (the accommodation member 30) is suppressed or prevented when moving in the main scanning direction along the shaft 22. That is, the accommodation member 30 into which the reading apparatus body 50 is accommodated smoothly moves in the main scanning direction.

Second Example

Next, a guide member 140 according to a second example will be described in detail. Moreover, the same reference numeral is given to a portion similar to the guide member 140 according to the first example and detailed description (also including the common operation) is appropriately omitted.

Figure 17:
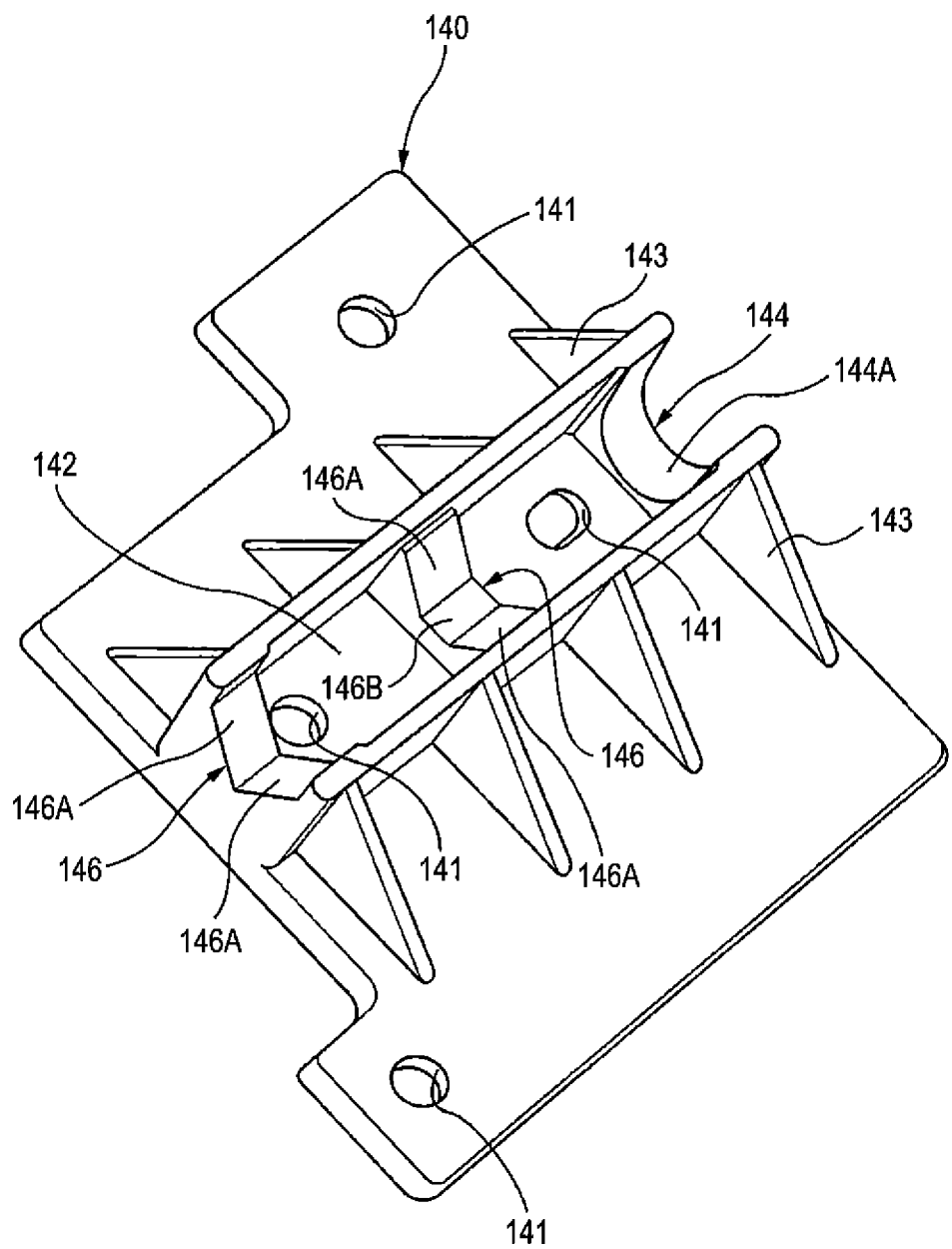
FIG. 17 is a perspective view illustrating a guide member according to a second example.
Figure 18:
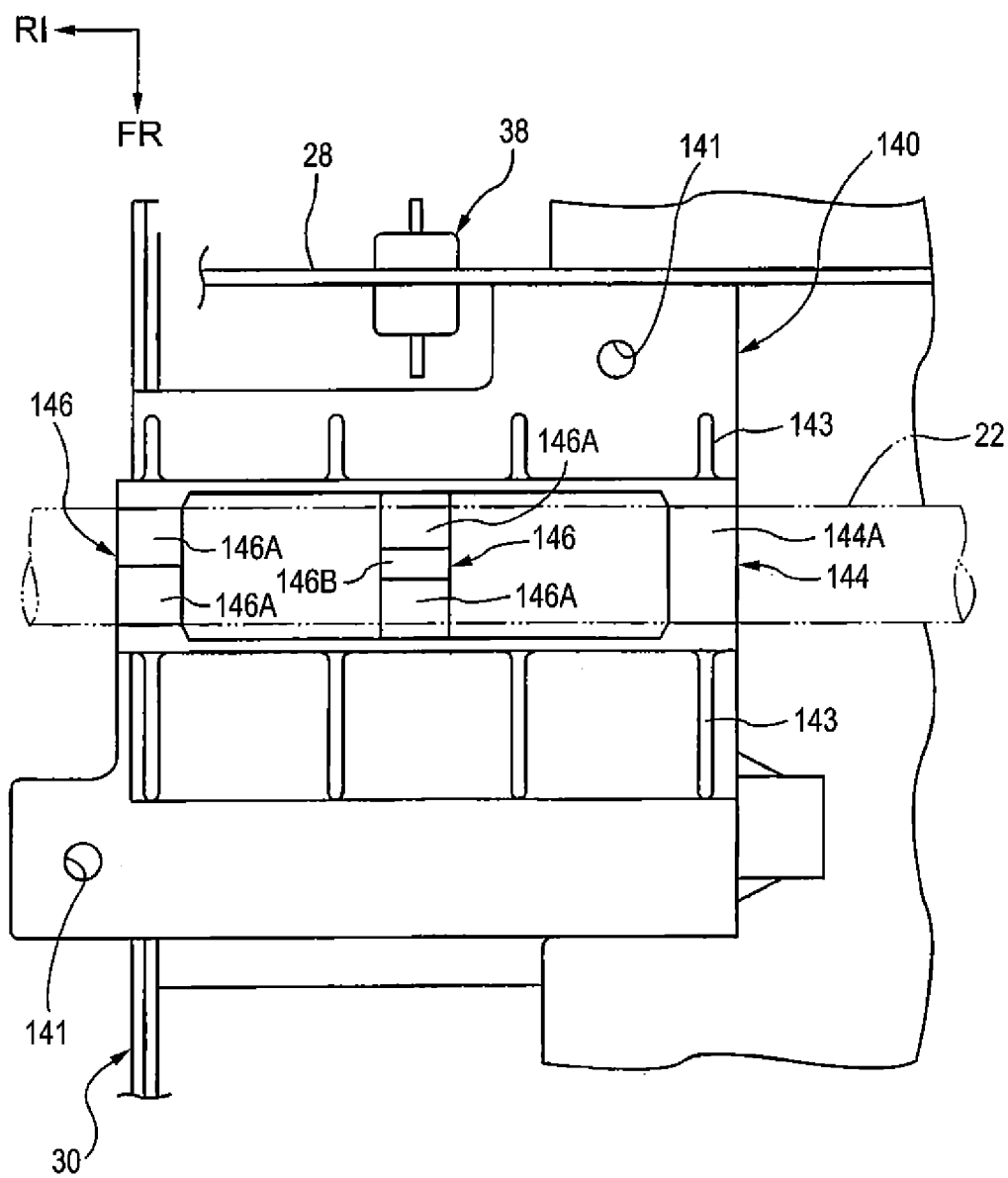
FIG. 18 is a bottom view illustrating the guide member according to the second example mounted on an accommodation member.

As illustrated in FIGS. 17 and 18, in a guide member 40, second receiving sections 146 having a pair of flat contact sections 147 (see FIG. 19) are also formed in a position overlapping the meshing section 38 in addition to an end portion on the downstream side in the main scanning direction in the axial direction of the shaft 22. That is, a plurality of sets (two sets) of the pair of flat contact sections 147 are formed in the guide member 40.

According to the guide member 140 having such a configuration, the guide member 140 is supported on the shaft 22 with further higher positional accuracy (without deviation in a direction intersecting the axial direction of the shaft 22 in a plan view). Thus, the looseness (vibration) of the reading apparatus body 50 (the accommodation member 30) is further suppressed or prevented when moving in the main scanning direction along the shaft 22.

Figure 19:
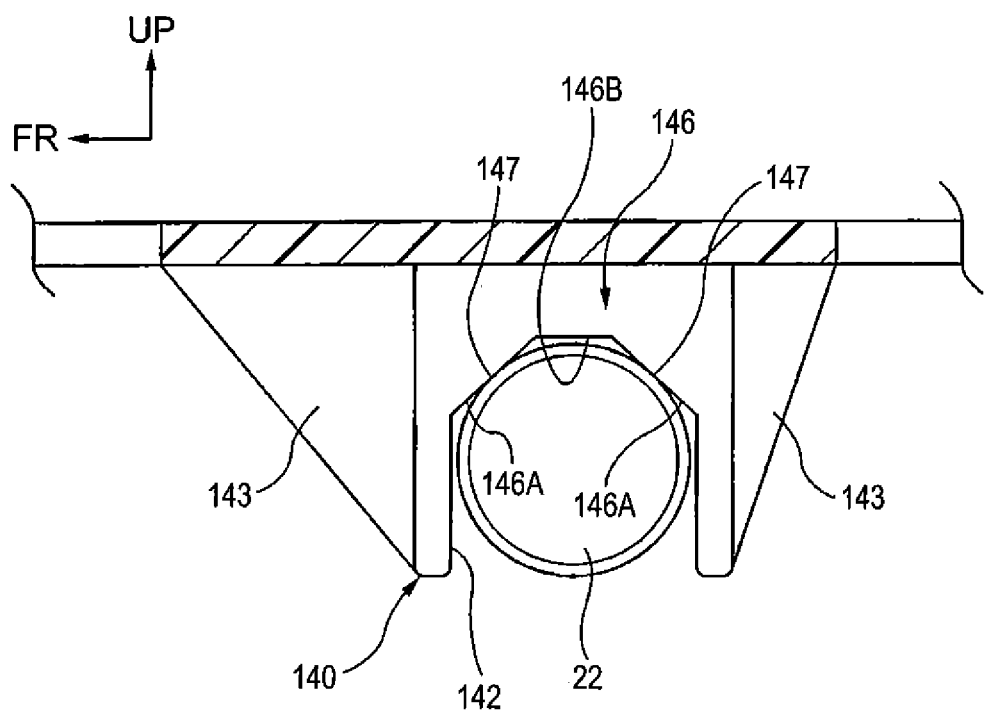
FIG. 19 is a side view illustrating a modified example of a flat contact section of the guide member according to the second example.

Moreover, the shape viewed in the main scanning direction of the second receiving section 146 is not limited to the substantially reverse "V" shape and, for example, may be the shape as illustrated in FIG. 19. That is, the uppermost end portion of the second receiving section 146 between the pair of flat contact sections 147 may be a shape of a flat surface 46B (see FIGS. 17 and 18) that does not come into contact with the uppermost end portion in the outer peripheral surface of the shaft 22.

Furthermore, the second receiving section 46, that is, the pair of flat contact sections 147 may be formed at least one set in a region on the downstream side in the main scanning direction from the meshing section 38 (including the meshing section 38) in the axial direction of the shaft 22 and specificity, is preferably formed at least in the end portion on the downstream side in the main scanning direction inside (the guide member 40) the concave groove section 42.

Furthermore, the first receiving section 44, that is, the curved surface contact section 145 may be formed at least one in a region on the upstream side in the main scanning direction further than the meshing section 38 (excepting the meshing section 38) in the axial direction of the shaft 22. That is, not only the second receiving section 146 but also both the first receiving section 144 and the second receiving section 146 are preferably formed in the guide member 40.

Above, the image reading apparatus 10' according to the embodiment is described with reference to the drawings, but the image reading apparatus 10' according to the embodiment is not limited to the illustrated examples, and a design thereof may be appropriately changed without departing from the gist of the invention. For example, the moving member moving the accommodation member 30 is not limited to the timing belt 28 and the fixing section fixed to moving member is not limited to the meshing section 38 meshing with the timing belt 28.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a reading apparatus body that reads a document mounted on a document platen;
   an accommodation member that accommodates the reading apparatus body and moves from one end portion to the other end portion of the document when reading the document; and
   a positioning member that is mounted on the reading apparatus body, the positioning member having a convex section positioning the reading apparatus body in a height direction by coming into contact with the document platen and an engaging section engaging with an engaged section formed in the accommodation member in the height direction,
   a lower end portion of the engaging section protruding to a lower side further than the reading apparatus body.

2. An image reading apparatus comprising:
   a reading apparatus body that reads a document mounted on a document platen;
   an accommodation member that accommodates the reading apparatus body and moves from one end portion to the other end portion of the document when reading the document; and
   a positioning member that is mounted on the reading apparatus body, the positioning member having a convex section positioning the reading apparatus body in a height direction by coming into contact with the document platen and an engaging section engaging with an engaged section formed in the accommodation member in the height direction,
   biasing members being provided between both lower surface end portions of the reading apparatus body and both bottom surface end portions of the accommodation member, and
   the engaging section being disposed in a position overlapping the biasing members when viewed in a longitudinal direction of the reading apparatus body.

3. An image reading apparatus comprising:
a reading apparatus body that reads a document mounted on a document platen;
an accommodation member that accommodates the reading apparatus body and moves from one end portion to the other end portion of the document when reading the document; and
a positioning member that is mounted on the reading apparatus body, the positioning member having a convex section positioning the reading apparatus body in a height direction by coming into contact with the document platen and an engaging section engaging with an engaged section formed in the accommodation member in the height direction,
biasing members being provided between both lower surface end portions of the reading apparatus body and both bottom surface end portions of the accommodation member, and
the convex section being disposed directly above the biasing members when viewed in a moving direction of the accommodation member.

4. An image reading apparatus comprising:
a reading apparatus body that reads a document mounted on a document platen;
an accommodation member that accommodates the reading apparatus body and moves from one end portion to the other end portion of the document when reading the document; and
a positioning member that is mounted on the reading apparatus body, the positioning member having a convex section positioning the reading apparatus body in a height direction by coming into contact with the document platen and an engaging section engaging with an engaged section formed in the accommodation member in the height direction,
the positioning member having a pair of leg sections, and a locking section formed in the leg section locked to a locked section formed in a position away to a side of a center portion of the reading apparatus body from the engaging section in the longitudinal direction so that the positioning member is mounted on the reading apparatus body.

5. The image reading apparatus according to claim 4,
wherein a hook section is formed in the engaging section and an upper surface of the hook section is an inclined surface inclined obliquely upward to the outside, and
a lower surface of the engaged section facing the upper surface of the hook section is also an inclined surface inclined obliquely upward to the outside.

6. An image reading apparatus comprising:
a reading apparatus body that reads a document mounted on a document platen;
an accommodation member that accommodates the reading apparatus body and moves from one end portion to the other end portion of the document supported on a cylindrical guide member when reading the document;
a fixing, section that is formed in the accommodation member and is fixed to a moving member for moving the accommodation member; and
a guided member that is provided in the accommodation member, the guided member having a pair of flat contact sections coming into contact with the guide member at two points in a circumferential direction when viewed in a moving direction of the accommodation member, and the pair of flat contact sections being formed in a region on a downstream side in the moving direction of the accommodation member from the fixing section in an axial direction of the guide member,
the guided member having, plural sets of the pairs of flat contact sections, and
one set of the pairs of flat contact sections being formed in a position overlapping the fixing section in the axial direction of the guide member.

7. The image reading apparatus according to claim 6,
wherein the guided member has a curved surface contact section that comes into contact with the guide member at one point in the circumferential direction when viewed in the moving direction of the accommodation member, and
the curved surface contact section is formed in a region on an upstream side in the moving direction of the accommodation member further than the fixing section in the axial direction of the guide member.

* * * * *